United States Patent
Aoshima et al.

(10) Patent No.: US 9,188,836 B2
(45) Date of Patent: Nov. 17, 2015

(54) SHUTTER DEVICE AND IMAGE PICKUP APPARATUS INCLUDING SHUTTER DEVICE

(71) Applicant: CANON KABUSHIKI KAISHA, Tokyo (JP)

(72) Inventors: Chikara Aoshima, Kawasaki (JP); Masahiro Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/538,055

(22) Filed: Nov. 11, 2014

(65) Prior Publication Data

US 2015/0131986 A1    May 14, 2015

(30) Foreign Application Priority Data

Nov. 14, 2013 (WO) .................. PCT/JP2013/080757

(51) Int. Cl.
*G03B 9/08* (2006.01)
*G03B 9/10* (2006.01)
*G03B 7/00* (2014.01)
*G03B 9/36* (2006.01)

(52) U.S. Cl.
CPC .. *G03B 9/10* (2013.01); *G03B 7/00* (2013.01); *G03B 9/36* (2013.01)

(58) Field of Classification Search
CPC .................................. G03B 9/10; G03B 7/093
See application file for complete search history.

(56) References Cited

U.S. PATENT DOCUMENTS

| | | | |
|---|---|---|---|
| 4,325,614 A * | 4/1982 | Grimes | 396/235 |
| 4,401,931 A * | 8/1983 | Kulterman et al. | 318/696 |
| 4,779,114 A * | 10/1988 | Kobayashi | 396/132 |
| 4,864,346 A * | 9/1989 | Shinozaki et al. | 396/244 |
| 5,327,185 A * | 7/1994 | Nakagawa | 396/460 |
| 5,953,550 A * | 9/1999 | Aoshima | 396/458 |
| 7,949,250 B1 * | 5/2011 | Tsai | 396/213 |
| 2012/0213505 A1 * | 8/2012 | Takahashi et al. | 396/489 |

FOREIGN PATENT DOCUMENTS

| | | |
|---|---|---|
| JP | H7-56211 A | 3/1995 |
| JP | 2004-104940 A | 4/2004 |
| JP | 2012-002985 A | 1/2012 |
| WO | 02/43227 A1 | 5/2002 |

* cited by examiner

*Primary Examiner* — W B Perkey

(74) *Attorney, Agent, or Firm* — Canon U.S.A., Inc. IP Division

(57) ABSTRACT

When a stepping motor is used as a driving source for a shutter device, if the stepping motor loses synchronization because of variations in load during driving or the like, it becomes unable to rotate a driving ring at that time, and this disables an exposure operation. In a first zone where a driven member is driven, but a light shielding member remains in a closed state or an open state, the motor drives the driven member in open-loop driving mode. In a second zone where the driven member is driven, and thus the light shielding member moves to the closed state or the open state, the motor drives the driven member in feed-back driving mode.

14 Claims, 17 Drawing Sheets

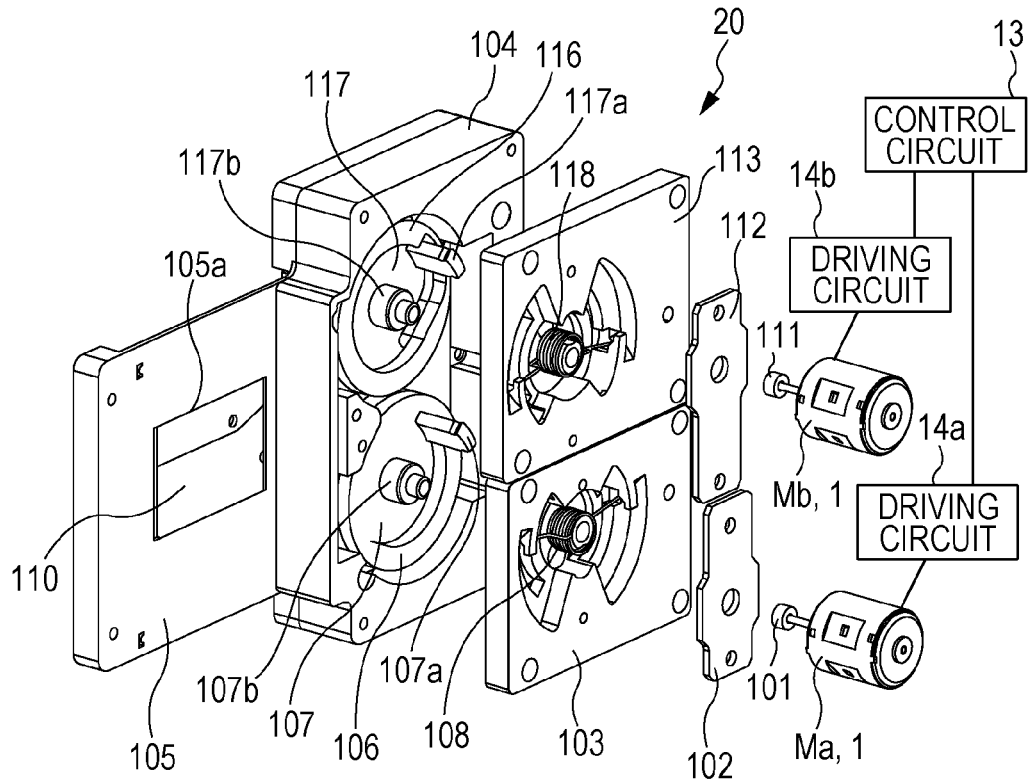
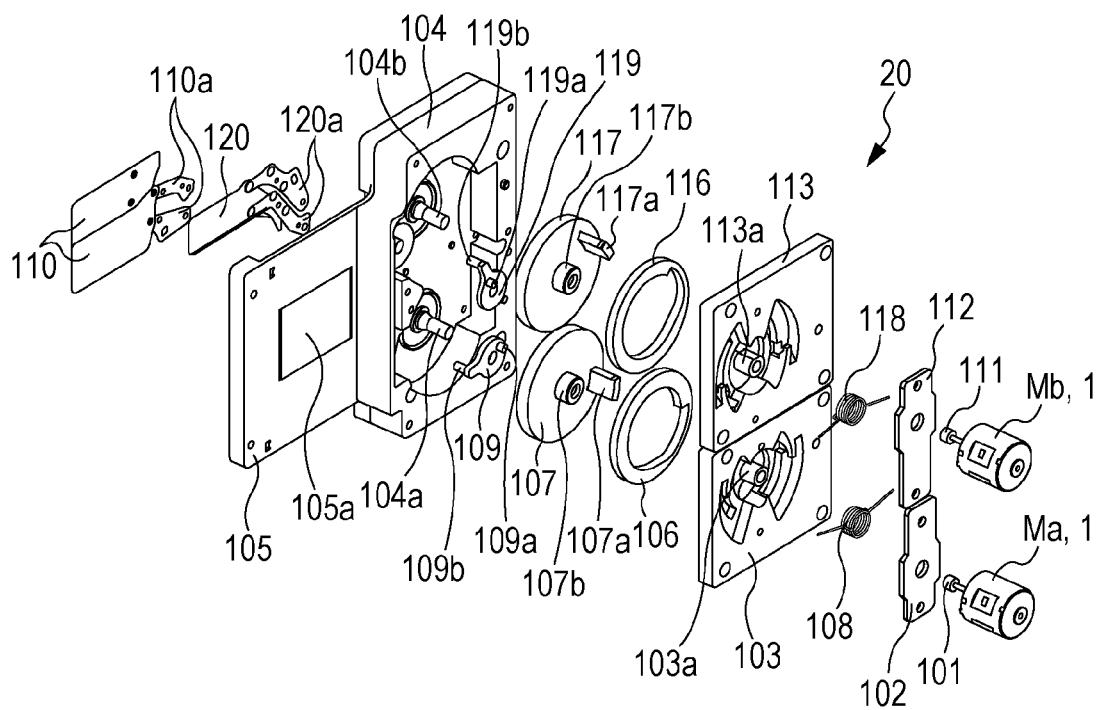

SHUTTER DEVICE AND IMAGE PICKUP APPARATUS INCLUDING SHUTTER DEVICE

TECHNICAL FIELD

The present invention relates to a shutter device and an image pickup apparatus including the shutter device.

BACKGROUND ART

Patent Literature 1 discloses a shutter device in which two shutter blades are made to open or close an opening portion by a stepping motor rotating a driving ring.

The shutter device disclosed in Patent Literature 1 has an acceleration region where the driving ring is rotated, but the two shutter blades do not open or close the opening portion and an exposure region where the two shutter blades are made to open or close the opening portion by rotation of the driving ring. In the shutter device disclosed in Patent Literature 1, after the stepping motor is accelerated in the acceleration region, the two shutter blades open or close the opening portion in the exposure region.

CITATION LIST

Patent Literature

PTL 1 Japanese Patent Laid-Open No. 7-56211

For the shutter device disclosed in Patent Literature 1, in the exposure region, a load for moving the two shutter blades may cause the stepping motor to lose synchronization.

That is, when the stepping motor is used as a driving source for the stepping motor, if the stepping motor loses synchronization because of variations in load during driving, it becomes unable to rotate the driving ring at that time, and this disables an exposure operation.

It is an object of the present invention to provide a shutter device in which, when a stepping motor drives a driven member and thus a light blocking member moves from a closed state to an open state or from the open state to the closed state, the stepping motor does not lose synchronization.

SUMMARY OF INVENTION

A shutter device according to an aspect of the present invention includes a stepping motor, a driven member, and a light shielding member. The stepping motor is configured to be driven in open-loop driving mode at which an energization state of a coil is switched at predetermined time intervals and in feed-back driving mode at which the energization state of the coil is switched in accordance with a rotation position of a rotor. The driven member is configured to be driven by the stepping motor. The light shielding member is configured to move to a closed state in which an aperture is closed and to an open state in which the aperture is open in coordination with driving the driven member. The driven member is configured to be driven in a first zone where the driven member is driven by the stepping motor, but the light shielding member remains in the closed state or the open state and in a second zone where the driven member is driven by the stepping motor, and thus the light shielding member moves from the closed state to the open state or from the open state to the closed state. The driven member is driven in the first zone by the stepping motor in one direction, and after the driven member is driven in the first zone, the driven member is driven in the second zone. In a case where the driven member is driven in the first zone, the stepping motor drives the driven member in the open-loop driving mode. In a case where the driven member is driven in the second zone, the stepping motor drives the driven member in the feed-back driving mode.

Further features of the present invention will become apparent from the following description of exemplary embodiments with reference to the attached drawings.

BRIEF DESCRIPTION OF DRAWINGS

FIGS. 1A and 1B are illustrations for describing a shutter unit 20 as a shutter according to one embodiment of the present invention.

DESCRIPTION OF EMBODIMENTS

Embodiments of the present invention are described in detail below with reference to the drawings.

Figure 17:
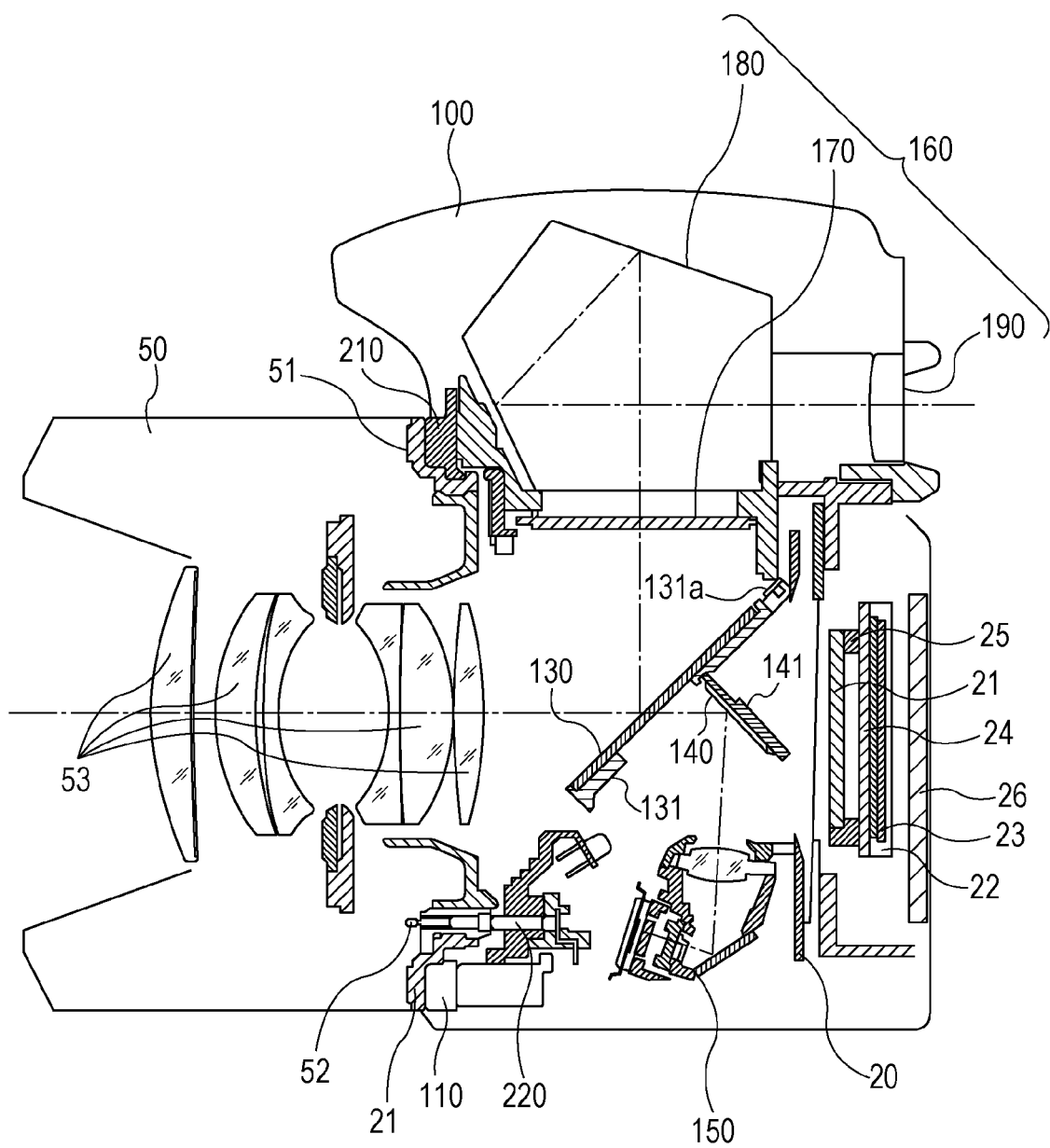
FIG. 17 is a central sectional view of the digital single-lens reflex camera body 100 as an image pickup apparatus according to one embodiment of the present invention and an interchangeable lens 50.

FIG. 17 is a central sectional view of a digital single-lens reflex camera body (hereinafter referred to as camera) 100 according to one embodiment of the present invention and an interchangeable lens 50 as an image pickup apparatus.

The interchangeable lens 50 is detachably fixed on the camera 100 with a mount section 210 in the camera 100 and a mount section 51 in the interchangeable lens 50. When the interchangeable lens 50 is attached to the camera 100, a contact section 220 in the camera 100 and a contact section 52 in the interchangeable lens 50 are electrically connected to each other.

A light flux that has passed through focus lenses 53 in the interchangeable lens 50 enters a main mirror 130 in the camera 100. The main mirror 130 is held on a main mirror holding frame 131 and is supported by a rotating shaft section 131a so as to be able to pivot between a mirror upper position and a mirror lower position.

The main mirror 130 is a semitransparent mirror. A light flux that has passed through the main mirror 130 is reflected downward by a sub mirror 140 and is guided to a focus detecting unit 150.

The sub mirror 140 is held on a sub mirror holding frame 141. The sub mirror holding frame 141 is supported by a hinge shaft (not illustrated) so as to be able to pivot with respect to the main mirror holding frame 131.

The focus detecting unit 150 is configured to detect the amount of defocusing of the focus lenses 53 and calculate the amount of driving of the focus lenses 53 for achieving focus for the focus lenses 53. The interchangeable lens 50 is configured to receive the calculated amount of driving through the contact sections 220 and 52. The interchangeable lens 50 is configured to adjust the focus by controlling a motor (not illustrated) and driving the focus lenses 53 on the basis of the received amount of driving.

A light flux reflected by the main mirror 130 is guided to an optical viewfinder 160. The optical viewfinder 160 includes a focusing plate 170, a pentaprism 180, and an eyepiece 190. The light flux guided to the optical viewfinder 160 forms an object image on the focusing plate 170. A user can observe the object image on the focusing plate 170 through the pentaprism 180 and the eyepiece 190.

A shutter unit 20 is arranged behind the sub mirror 140. An optical low-pass filter 21, an image pickup element holder 22, an image pickup element 23, a cover member 24, and a rubber member 25 are arranged behind the shutter unit 20. In shooting, a light flux that has passed through the optical low-pass filter 21 enters the image pickup element 23. The image pickup element holder 22 is fixed to the housing of the camera 100 with a screw (not illustrated). The image pickup element 23 is held by the image pickup element holder 22. The cover member 24 protects the image pickup element 23. The rubber member 25 holds the optical low-pass filter 21 and hermetically seals the gap between the optical low-pass filter 21 and the image pickup element 23.

A display monitor 26 may be a liquid crystal display monitor and is configured to display a shot image and display various setting statuses of the camera 100.

FIGS. 1A and 1B are illustrations for describing the shutter unit 20 as a shutter according to one embodiment of the present invention. FIG. 1A is an exploded perspective view for describing a configuration of the shutter unit 20. FIG. 1B is an exploded perspective view illustrating the shutter unit 20 further disassembled from the state illustrated in FIG. 1A.

As illustrated in FIG. 1A, the shutter unit 20 is driven by a first motor Ma and a second motor Mb. The first motor Ma is connected to a driving circuit 14a. The second motor Mb is connected to a driving circuit 14b. The driving circuit 14a and the driving circuit 14b are connected to a control circuit 13. In the present embodiment, the first motor Ma and the second motor Mb are the same motors. A pinion gear 101 is press-fit to the output shaft of the first motor Ma. A pinion gear 111 is press-fit to the output shaft of the second motor Mb.

The first motor Ma is mounted to a motor mounting plate 102. The motor mounting plate 102 is fixed to a cover plate 103. The second motor Mb is mounted to a motor mounting plate 112. The motor mounting plate 112 is fixed to a cover plate 113.

A driving mechanism accommodating section 104 accommodates a first rotor plate 107 to which a weight 106 is bonded and a second rotor plate 117 to which a weight 116 is bonded. The first rotor plate 107 includes a protruding section 107a. When the cover plate 103 is mounted on the driving mechanism accommodating section 104, the protruding section 107a is exposed through the cover plate 103. The second rotor plate 117 includes a protruding section 117a. When the cover plate 113 is mounted on the driving mechanism accommodating section 104, the protruding section 117a is exposed through the cover plate 113. A first spring 108 is mounted to the cover plate 103. A second spring 118 is mounted to the cover plate 113.

The first rotor plate 107 includes a gear section 107b. When the motor mounting plate 102 is fixed on the cover plate 103, the pinion gear 101 and the gear section 107b engage with each other. The second rotor plate 117 includes a gear section 117b. When the motor mounting plate 112 is fixed on the cover plate 113, the pinion gear 111 and the gear section 117b engage each other.

Accordingly, when the first motor Ma is driven, the first rotor plate 107 rotates; when the second motor Mb is driven, the second rotor plate 117 rotates.

A blade accommodating section 105 has an aperture 105a. The blade accommodating section 105 accommodates a first blade 110 and a second blade 120.

As illustrated in FIG. 1B, a driving arm 110a is mounted to the first blade 110. A driving arm 120a is mounted to the second blade 120.

A first driving lever 109 and a second driving lever 119 are supported on the driving mechanism accommodating section 104. The first driving lever 109 includes a cam pin 109a and an engagement pin 109b. The cam pin 109a engages with a cam groove 107c in the first rotor plate 107. The engagement pin 109b engages with the driving arm 110a. When the first driving lever 109 pivots, the first blade 110 opens or closes the aperture 105a. Similarly, the second driving lever 119 includes a cam pin 119a and an engagement pin 119b. The cam pin 119a engages with a cam groove 117c in the second rotor plate 117. The engagement pin 119b engages with the driving arm 120a. When the second driving lever 119 pivots, the second blade 120 opens or closes the aperture 105a. In the present embodiment, the first driving lever 109 and the second driving lever 119 are the same components.

The driving mechanism accommodating section 104 includes a shaft section 104a and a shaft section 104b. The first rotor plate 107 is supported by the shaft section 104a. The second rotor plate 117 is supported by the shaft section 104b. The first rotor plate 107 includes the gear section 107b on its front surface. The weight 106 is bonded and fixed to the circumferential section of the first rotor plate 107. The first rotor plate 107 includes the cam groove 107c, with which the cam pin 109a engages, in its back surface.

Similarly, the second rotor plate 117 includes the gear section 117b on its front surface. The weight 116 is bonded and fixed to the circumferential section of the second rotor plate 117. The second rotor plate 117 includes the cam groove 117c, with which the cam pin 119a engages, in its back surface. In the present embodiment, the first rotor plate 107 and the second rotor plate 117 are the same components. The weight 106 and the weight 116 are the same components.

Each of the first rotor plate 107 and the second rotor plate 117 functions as a driven member. The first blade 110 and the first driving lever 109 function as a light shielding member capable of moving between a closed state where they closes the aperture 105a and an open state where they opens the aperture 105a in coordination with driving the first rotor plate 107. The second blade 120 and the second driving lever 119 function as a light shielding member capable of moving between a closed state where they closes the aperture 105a and an open state where they opens the aperture 105a in coordination with driving the second rotor plate 117. Each of the first spring 108 and the second spring 118 functions as an urging member.

Figure 2:
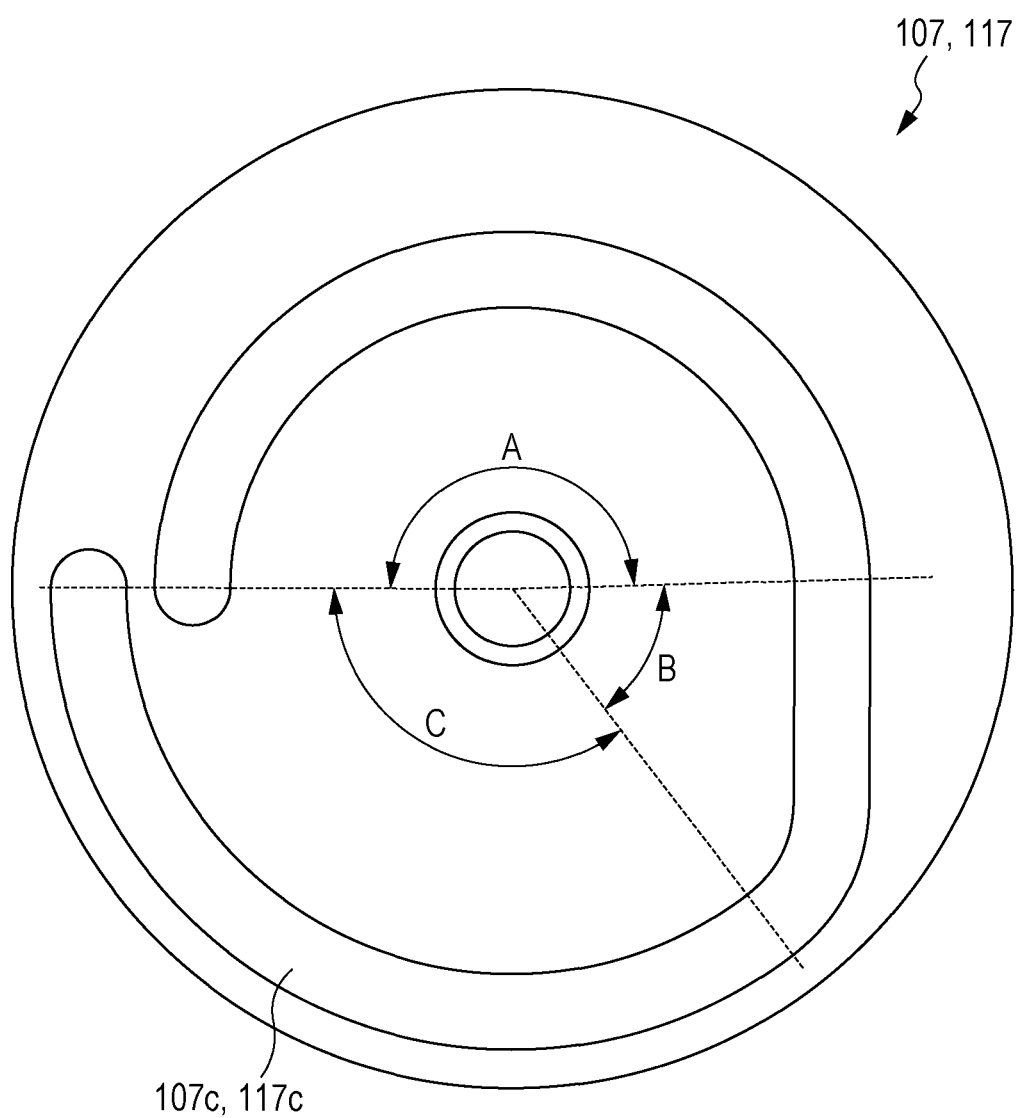
FIG. 2 is an illustration of a first rotor plate 107 (second rotor plate 117) as seen from a back surface side.

FIG. 2 is an illustration of the first rotor plate 107 (second rotor plate 117) as seen from the back surface side. The cam groove 107c (cam groove 117c), with which the cam pin 109a (cam pin 119a) engages, are disposed in the back surface of the first rotor plate 107 (second rotor plate 117). As illustrated in FIG. 2, a first idle running driving region A, an exposure driving region B, and a second idle running driving region C are set in the cam groove 107c (cam groove 117c). In the first idle running driving region A and the second idle running driving region C in the cam groove 107c (cam groove 117c), the cam lift is substantially zero.

When the cam pin 109a (cam pin 119a) follows the first idle running driving region A or the second idle running driving region C, the first driving lever 109 (second driving lever 119) does not rotate and the first blade 110 (second blade 120) remains in a closed state or an open state.

When the cam pin 109a (cam pin 119a) follows the exposure driving region B, the first driving lever 109 (second driving lever 119) rotates and the first blade 110 (second blade 120) moves from the closed state to the open state or from the open state to the closed state.

When the first rotor plate 107 (second rotor plate 117) rotates clockwise, the cam pin 109a (cam pin 119a) follows the first idle running driving region A, the exposure driving region B, and the second idle running driving region C in this order.

The details of the clockwise rotation of the first rotor plate 107 (second rotor plate 117) are described below.

The first idle running driving region A is a first cam region. The zone where the cam pin 109a (cam pin 119a) follows the first idle running driving region A is a first zone.

The exposure driving region B is a second cam region. The zone where the cam pin 109a (cam pin 119a) follows the exposure driving region B is a second zone.

The second idle running driving region C is a third cam region. The zone where the cam pin 109a (cam pin 119a) follows the second idle running driving region C is a third zone.

In contrast, when the first rotor plate 107 (second rotor plate 117) rotates counterclockwise, the cam pin 109a (cam pin 119a) follows the second idle running driving region C, the exposure driving region B, and the first idle running driving region A in this order.

The details of the counterclockwise rotation of the first rotor plate 107 (second rotor plate 117) are described below.

The second idle running driving region C is the first cam region. The zone where the cam pin 109a (cam pin 119a) follows the second idle running driving region C is the first zone.

The exposure driving region B is the second cam region. The zone where the cam pin 109a (cam pin 119a) follows the exposure driving region B is the second zone.

The first idle running driving region A is the third cam region. The zone where the cam pin 109a (cam pin 119a) follows the first idle running driving region A is the third zone.

That is, the first rotor plate 107 (second rotor plate 117) is driven in one direction, and thus the first rotor plate 107 (second rotor plate 117) is driven in the first zone. After the first rotor plate 107 (second rotor plate 117) is driven in the first zone, the first rotor plate 107 (second rotor plate 117) is driven in the second zone.

As illustrated in FIG. 1B, the cover plate 103 is provided with a hollow shaft section 103a. When the cover plate 103 is mounted on the driving mechanism accommodating section 104, the protruding section 107a in the first rotor plate 107 is exposed through the cover plate 103 and the shaft section 104a is fit into an inner section of the hollow shaft section 103a. The first spring 108 is mounted on an outer section of the hollow shaft section 103a.

Similarly, the cover plate 113 is provided with a hollow shaft section 113a. When the cover plate 113 is mounted on the driving mechanism accommodating section 104, the protruding section 117a in the second rotor plate 117 is exposed through the cover plate 113 and the shaft section 104b is fit into an inner section of the hollow shaft section 113a. The second spring 118 is mounted on an outer section of the hollow shaft section 113a.

When the motor mounting plate 102 with the first motor Ma mounted thereon is mounted on the cover plate 103, the output shaft of the first motor Ma penetrates through an opening in the cover plate 103, and the pinion gear 101 and the gear section 107b engage with each other. Similarly, when the motor mounting plate 112 with the second motor Mb mounted thereon is mounted on the cover plate 113, the output shaft of the second motor Mb penetrates through an opening in cover plate 113, and the pinion gear 111 and the gear section 117b engage with each other.

In the present embodiment, the first motor Ma, the first rotor plate 107, the first spring 108, the first driving lever 109, and the first blade 110 constitute a first shutter driving mechanism. The second motor Mb, the second rotor plate 117, the second spring 118, the second driving lever 119, and the second blade 120 constitute a second shutter driving mechanism.

Each of the first motor Ma and the second motor Mb is a stepping motor that can be driven in step-driving (open-loop driving) at which an energization state of the coil is switched at predetermined time intervals and in two types of feed-back driving with different advance angle values. To drive the first motor Ma and the second motor Mb in the step driving mode (open-loop driving mode), the energization state of the coil is switched at predetermined time intervals. To drive the first motor Ma and the second motor Mb in the feed-back driving mode, the energization state of the coil is switched in accordance with an output of a positional sensor.

The detailed configuration of each of the first motor Ma and the second motor Mb is described below.

Figure 11A:
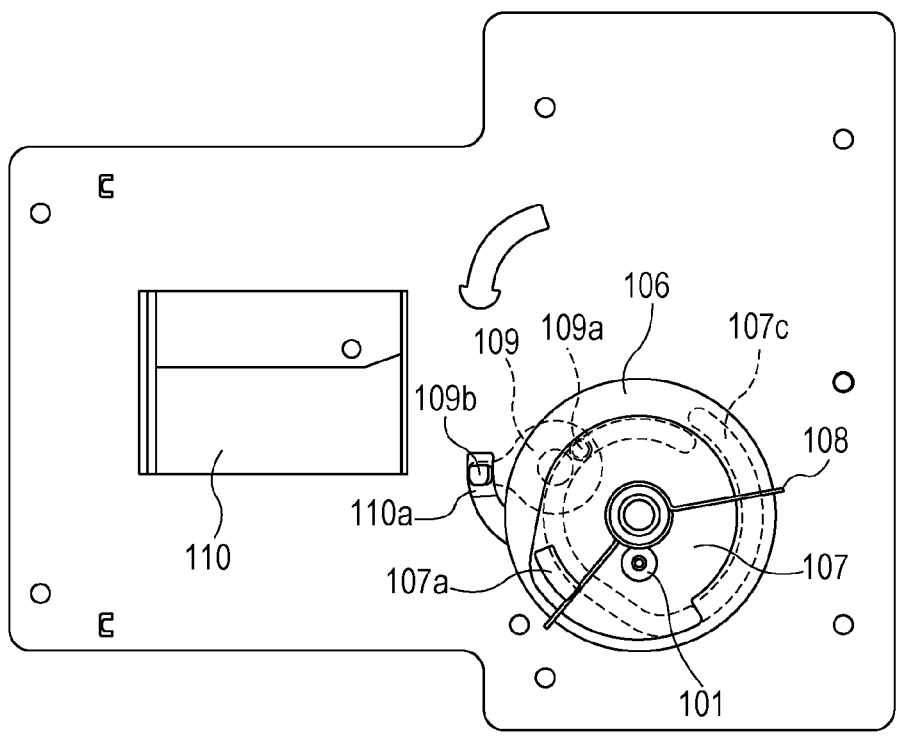
FIGS. 11A and 11B are illustrations for describing a state of the shutter unit 20 in I status.
Figure 11B:
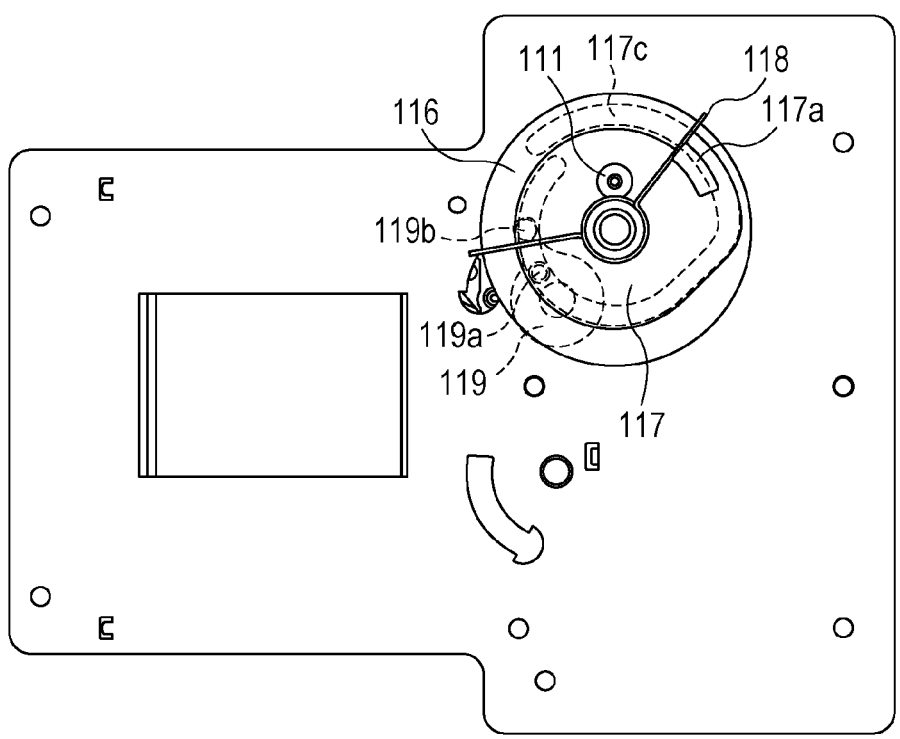
Figure 12:
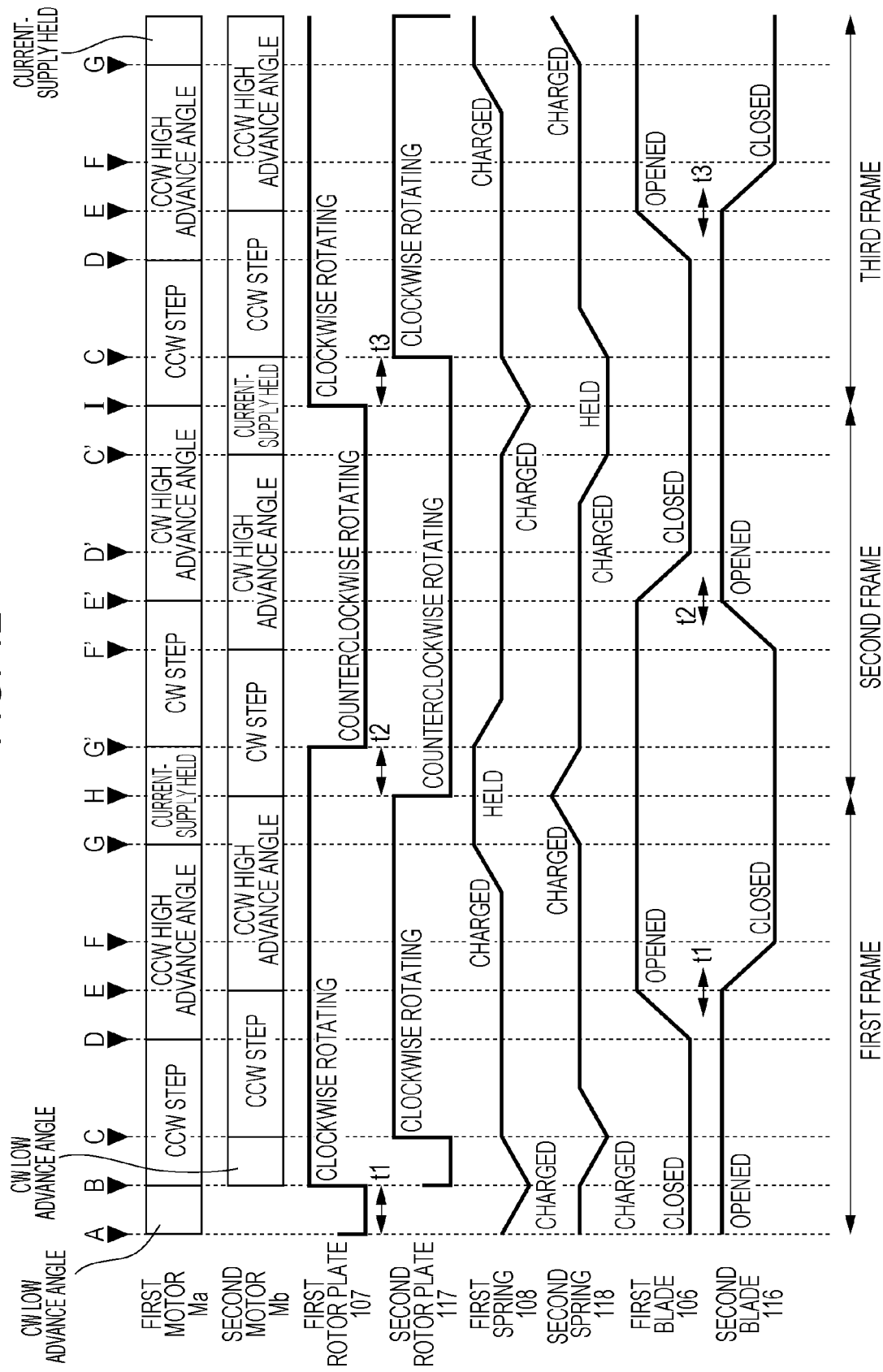
FIG. 12 is a timing chart for describing operations of the shutter unit 20 when a camera 100 is operating in continuous shooting mode.

FIG. 12 is a timing chart for describing operations of the shutter unit 20 when the camera 100 is operating in continuous shooting mode. FIGS. 3 to 11 are illustrations for describing the states of the shutter unit 20 in A to I statuses illustrated in FIG. 12.

The shutter unit 20 according to the present embodiment performs a first-frame shooting operation from the A status to H status illustrated in FIG. 12. In the first-frame shooting operation, the first shutter driving mechanism functions as a leading blade, and the second shutter driving mechanism functions as a trailing blade. The shutter unit 20 according to the present embodiment performs a second-frame shooting operation from the H status to I status illustrated in FIG. 12. In the second-frame shooting operation, the second shutter driving mechanism functions as the leading blade, and the second shutter driving mechanism functions as the trailing blade. In a third-frame shooting operation, the first shutter driving mechanism functions as the leading blade, and the second shutter driving mechanism functions as the trailing blade.

Figure 3A:
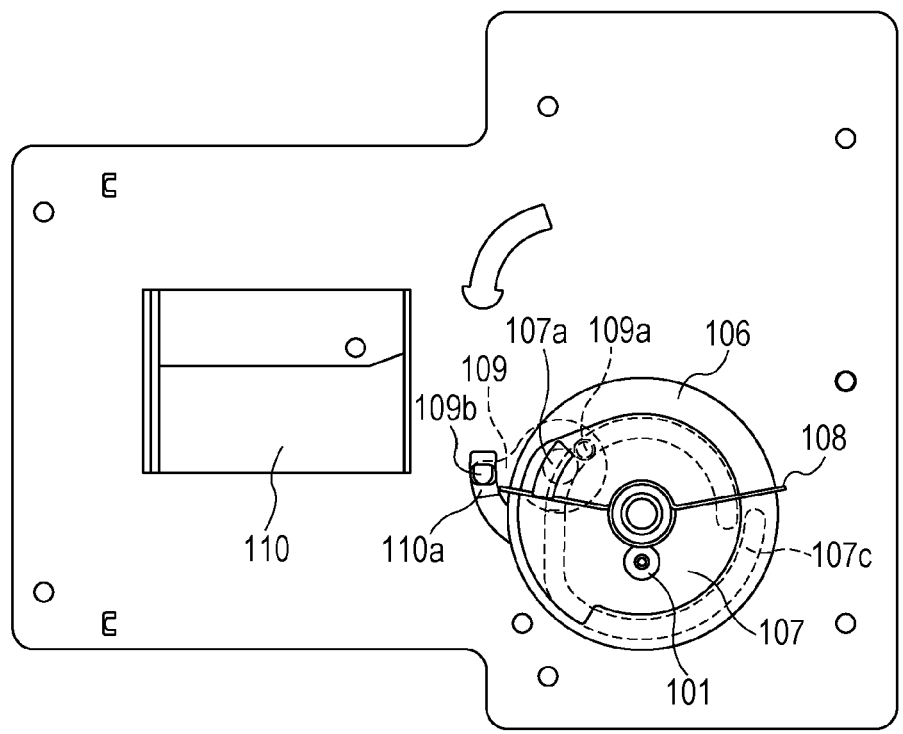
FIGS. 3A and 3B are illustrations for describing a state of the shutter unit 20 in A status.
Figure 3B:
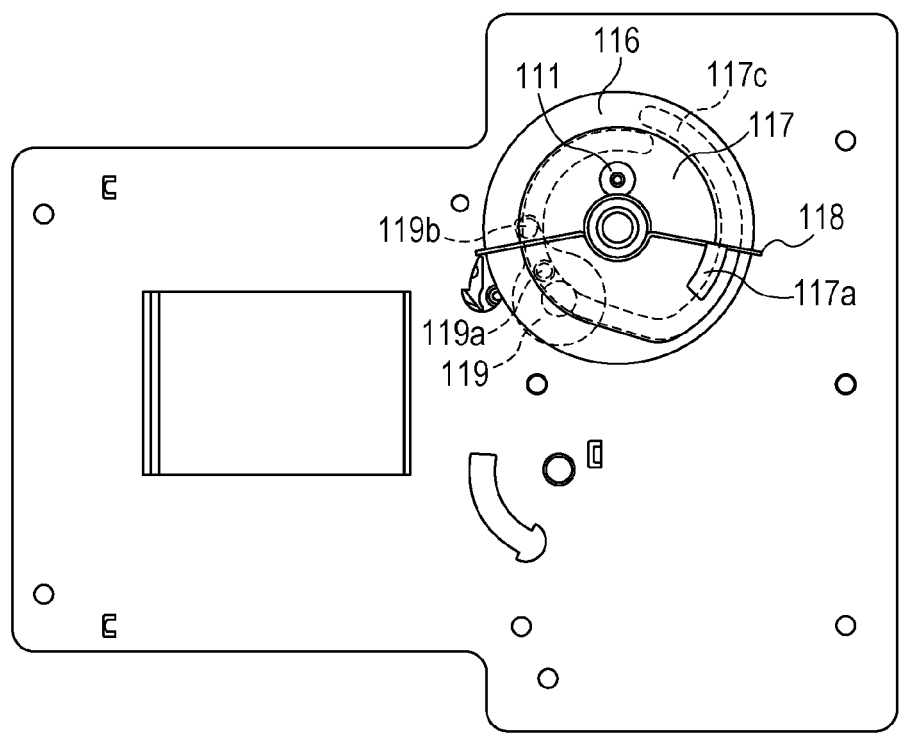

When the camera 100 starts a shooting operation, it is in A status illustrated in FIG. 12. FIGS. 3A and 3B are illustrations for describing a state of the shutter unit 20 in A status. FIG. 3A is an illustration for describing the state of the first shutter driving mechanism. FIG. 3B is an illustration for describing the state of the second shutter driving mechanism.

As illustrated in FIG. 3A, in A status, the first blade 110 closes the aperture 105a. In the state illustrated in FIG. 3A, the protruding section 107a in the first rotor plate 107 is in contact with the left arm section of the first spring 108. However, in this state, the first spring 108 is not charged and is in its natural state.

As illustrated in FIG. 3B, in A status, the second blade 120 opens the aperture 105a. At this time, the protruding section 117a in the second rotor plate 117 is in contact with the right arm section of the second spring 118. However, in this state, the second spring 118 is not charged and is in its natural state.

As illustrated in FIG. 12, in A status, the control circuit 13 controls the driving circuit 14a such that the first motor Ma is driven clockwise in feed-back driving mode with low advance angle. In A status, the control circuit 13 controls the driving circuit 14b such that the second motor Mb is not driven in any direction. Thus the shutter unit 20 moves to the B status illustrated in FIG. 12.

Figure 4A:
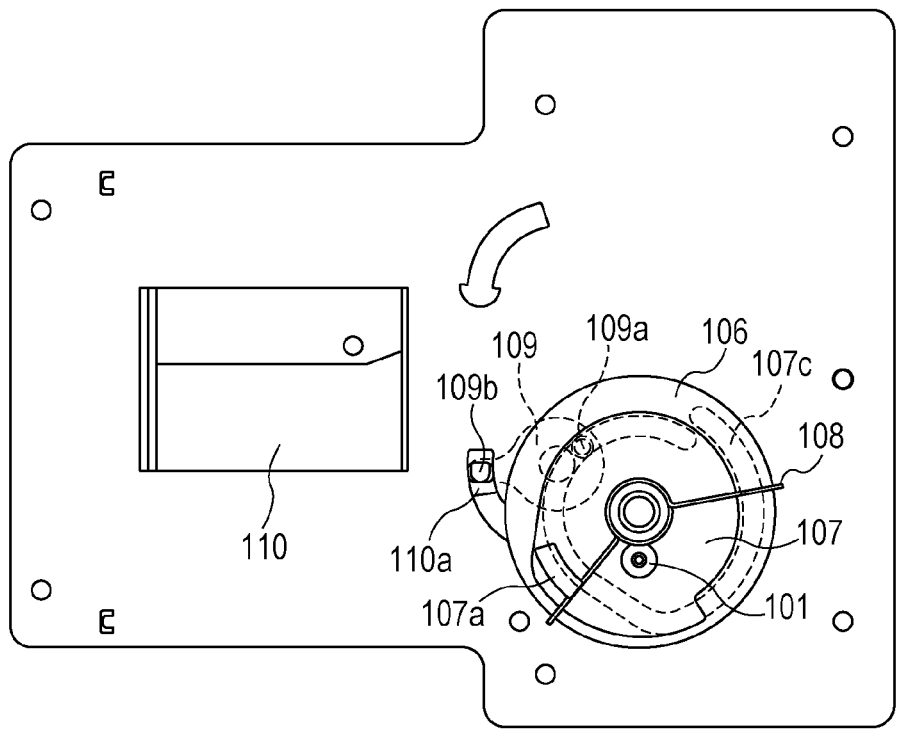
FIGS. 4A and 4B are illustrations for describing a state of the shutter unit 20 in B status.
Figure 4B:
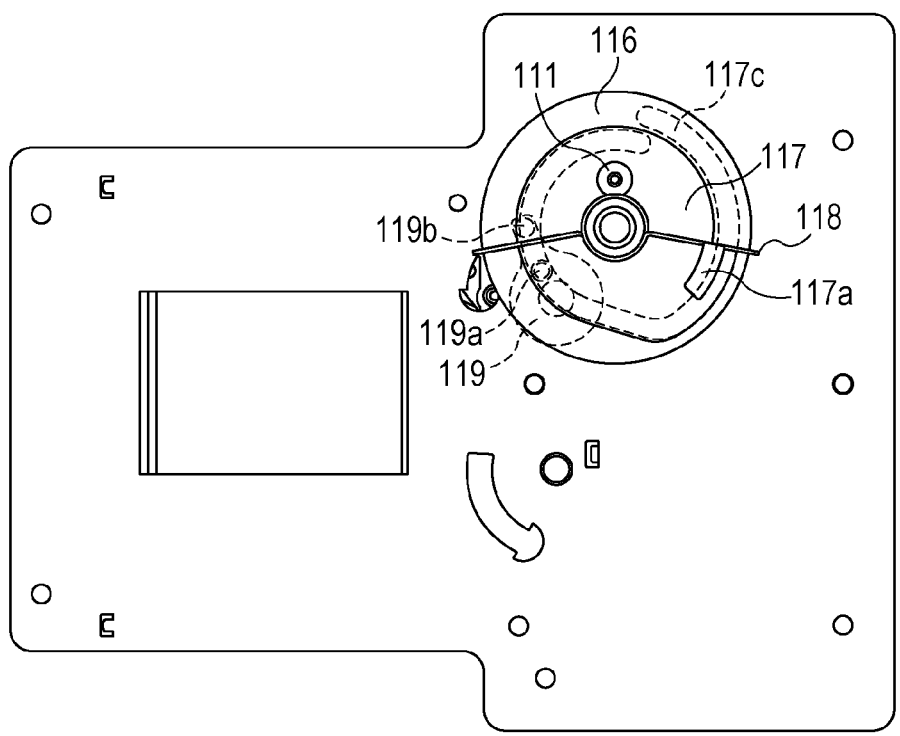

FIGS. 4A and 4B are illustrations for describing a state of the shutter unit 20 in B status. FIG. 4A is an illustration for describing the state of the first shutter driving mechanism. FIG. 4B is an illustration for describing the state of the second shutter driving mechanism.

As illustrated in FIG. 4A, in B status, the first blade 110 closes the aperture 105a. As illustrated in FIG. 12, in the period from the A status to B status, the first motor Ma is driven clockwise in feed-back driving mode with low advance angle. Thus the first rotor plate 107 rotates counterclockwise from the state illustrated in FIG. 3A. Here, because the pinion gear 101 in the first motor Ma and the gear section 107b in the first rotor plate 107 engage with each other, the rotation direction of the first motor Ma and that of the first rotor plate 107 are opposite.

When the first rotor plate 107 rotates counterclockwise from the state illustrated in FIG. 3A (A status), the first rotor plate 107 rotates while charging the first spring 108. In this period, the first rotor plate 107 rotates counterclockwise while charging the first spring 108, and thus variations in load during the driving of the first motor Ma are large. However, because the first motor Ma is driven in feed-back driving mode with low advance angle, the first motor Ma does not lose synchronization.

In the state illustrated in FIG. 4A (B status), because the first spring 108 is charged, the first rotor plate 107 is urged in a clockwise direction by the first spring 108.

When the first rotor plate 107 rotates counterclockwise from the state illustrated in FIG. 3A (A status), the cam pin 109a in the first driving lever 109 follows the first idle running driving region A in the cam groove 107c in this period. Accordingly, the position of the first driving lever 109 in the state illustrated in FIG. 4A (B status) is substantially the same as the position of the first driving lever 109 in the state illustrated in FIG. 3A (A status).

The B status of the second shutter driving mechanism illustrated in FIG. 4B is the same as the A status of the second shutter driving mechanism illustrated in FIG. 3B. When the state moves from the A status to B status, the second motor Mb is not driven, and thus the second rotor plate 117 remains unchanged from the state illustrated in FIG. 3B (A status).

As illustrated in FIG. 12, in B status, the control circuit 13 controls the driving circuit 14a such that the first motor Ma is driven counterclockwise in step driving mode. In B status, the control circuit 13 controls the driving circuit 14b such that the second motor Mb is driven clockwise in feed-back driving mode with low advance angle. Thus the shutter unit 20 moves to the C status illustrated in FIG. 12. That is, in the present embodiment, the start of driving for an approach run in the second shutter driving mechanism lags behind the start of driving for an approach run in the first shutter driving mechanism by an exposure time t1.

The first shutter driving mechanism starts driving for an approach run in step driving mode in B status. In driving for the approach run, the control circuit 13 gradually increases the rotational speed of the first motor Ma by gradually reducing the width of a driving pulse. In driving for the approach run, the cam pin 109a follows the first idle running driving region A in the cam groove 107c, where the cam lift is substantially zero. Accordingly, in this period, because the first driving lever 109 does not virtually rotate even when the first rotor plate 107 is driven, variations in load during the driving of the first motor Ma are small. Thus when the first motor Ma is driven in step driving mode, the first motor Ma does not lose synchronization.

Figure 5A:
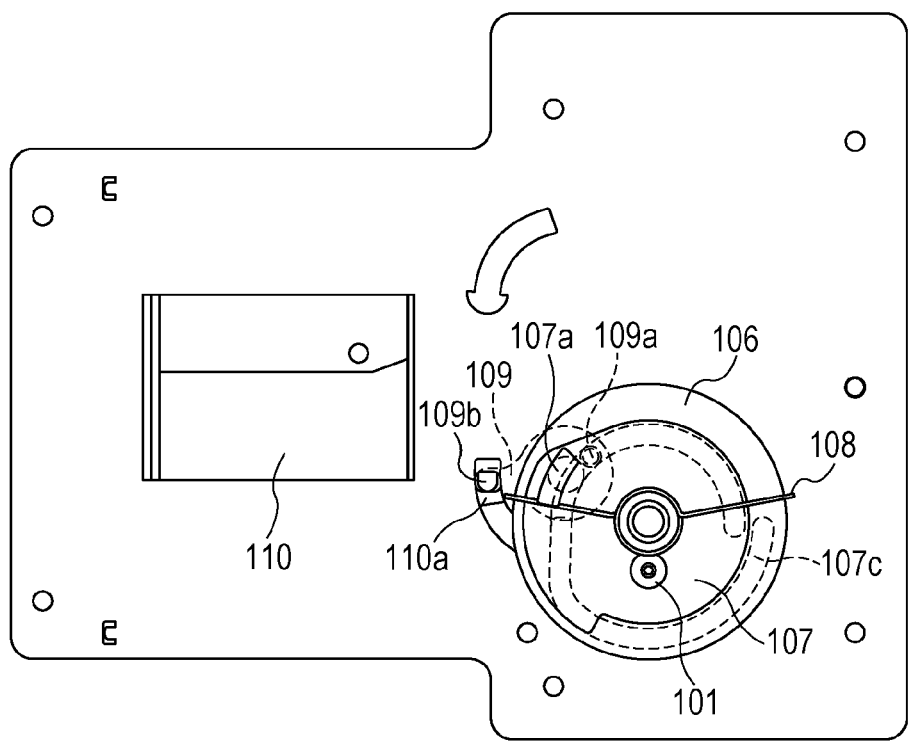
FIGS. 5A and 5B are illustrations for describing a state of the shutter unit 20 in C status.
Figure 5B:
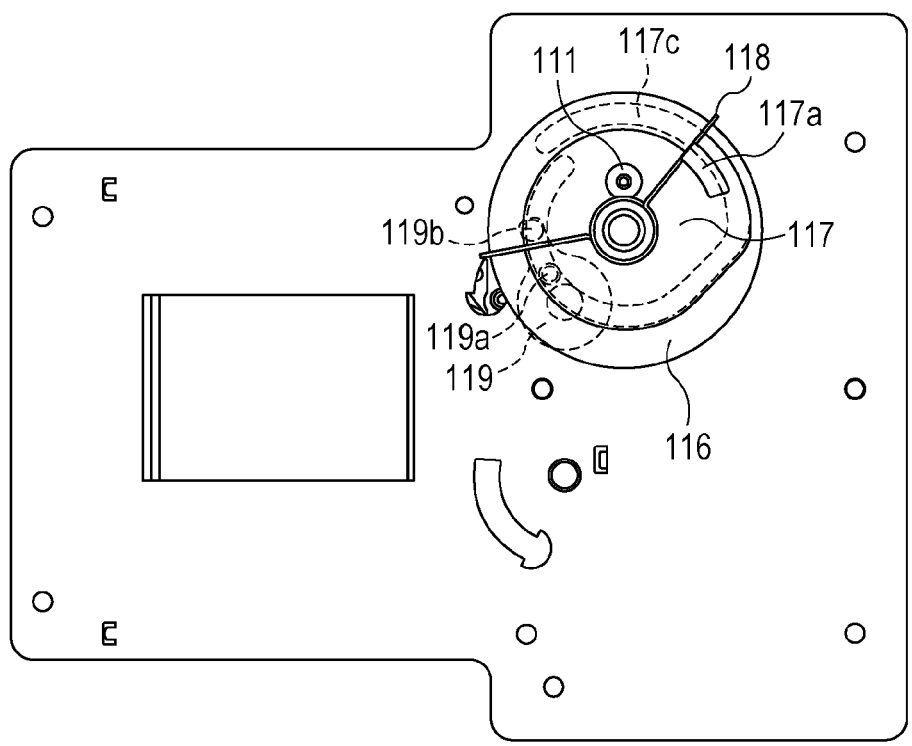

FIGS. 5A and 5B are illustrations for describing a state of the shutter unit 20 in C status. FIG. 5A is an illustration for describing the state of the first shutter driving mechanism. FIG. 5B is an illustration for describing the state of the second shutter driving mechanism.

As illustrated in FIG. 5A, in C status, the first blade 110 closes the aperture 105a. Because the first motor Ma is driven counterclockwise in the period from the B status to C status, the first rotor plate 107 is rotated clockwise by a combined force of the driving force of the first motor Ma and the urging force of the first spring 108. The urging force of the first spring 108 is provided to the first rotor plate 107 up to the C status illustrated in FIG. 5A.

When the first rotor plate 107 rotates clockwise from the state illustrated in FIG. 4A (B status), the cam pin 109a in the first driving lever 109 follows the first idle running driving region A in the cam groove 107c in this period. Accordingly, the position of the first driving lever 109 in the state illustrated in FIG. 5A (C status) is substantially the same as the position of the first driving lever 109 in the state illustrated in FIG. 4A (B status).

As illustrated in FIG. 5B, in C status, the second blade 120 opens the aperture 105a. In the period from the B status to C status, because the second motor Mb is driven clockwise in feed-back driving mode with low advance angle, the second rotor plate 117 rotates counterclockwise from the state illustrated in FIG. 4B. Here, because the pinion gear 111 in the second motor Mb and the gear section 117b in the second rotor plate 117 engage with each other, the rotation direction of the second motor Mb and that of the second rotor plate 117 are opposite.

When the second rotor plate 117 rotates clockwise from the state illustrated in FIG. 4B (B status), the second rotor plate 117 rotates while charging the second spring 118. In this period, the second rotor plate 117 rotates clockwise while charging the second spring 118, and thus variations in load during the driving of the second motor Mb are large. However, because the second motor Mb is driven in feed-back driving mode with low advance angle, the second motor Mb does not lose synchronization.

In the state illustrated in FIG. 5B (C status), because the second spring 118 is charged, the second rotor plate 117 is urged in a clockwise direction by the second spring 118.

When the second rotor plate 117 rotates clockwise from the state illustrated in FIG. 4B (B status), the cam pin 119a in the second driving lever 119 also follows the first idle running driving region A in the cam groove 117c in this period. Accordingly, the position of the second driving lever 119 in the state illustrated in FIG. 5B (C status) is substantially the same as the position of the second driving lever 119 in the state illustrated in FIG. 4B (B status).

As illustrated in FIG. 12, in C status, the control circuit 13 also controls the driving circuit 14a such that the first motor Ma is driven counterclockwise in step driving mode. In C status, the control circuit 13 controls the driving circuit 14b such that the second motor Mb is driven counterclockwise in step driving mode. Thus the shutter unit 20 moves to the D status illustrated in FIG. 12. The second shutter driving mechanism starts driving for an approach run in step driving mode in C status. In driving for the approach run, the control circuit 13 gradually increases the rotational speed of the second motor Mb by gradually reducing the width of a driving pulse. In driving for the approach run, the cam pin 119a follows the first idle running driving region A in the cam groove 117c, where the cam lift is substantially zero. Thus when the second motor Mb is driven in step driving mode, the second motor Mb does not lose synchronization.

Figure 6A:
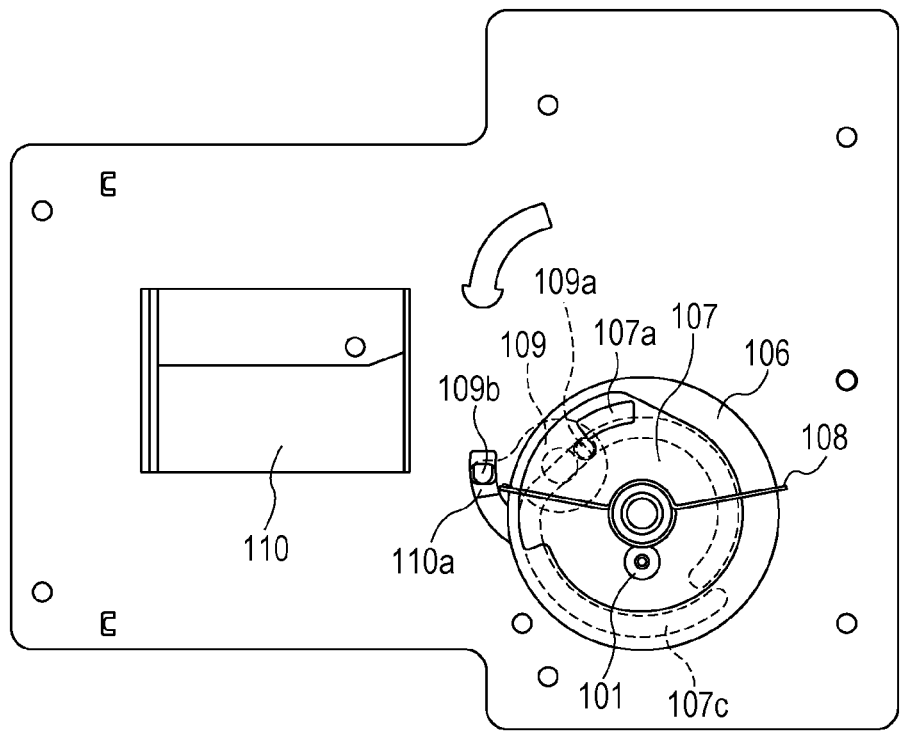
FIGS. 6A and 6B are illustrations for describing a state of the shutter unit 20 in D status.
Figure 6B:
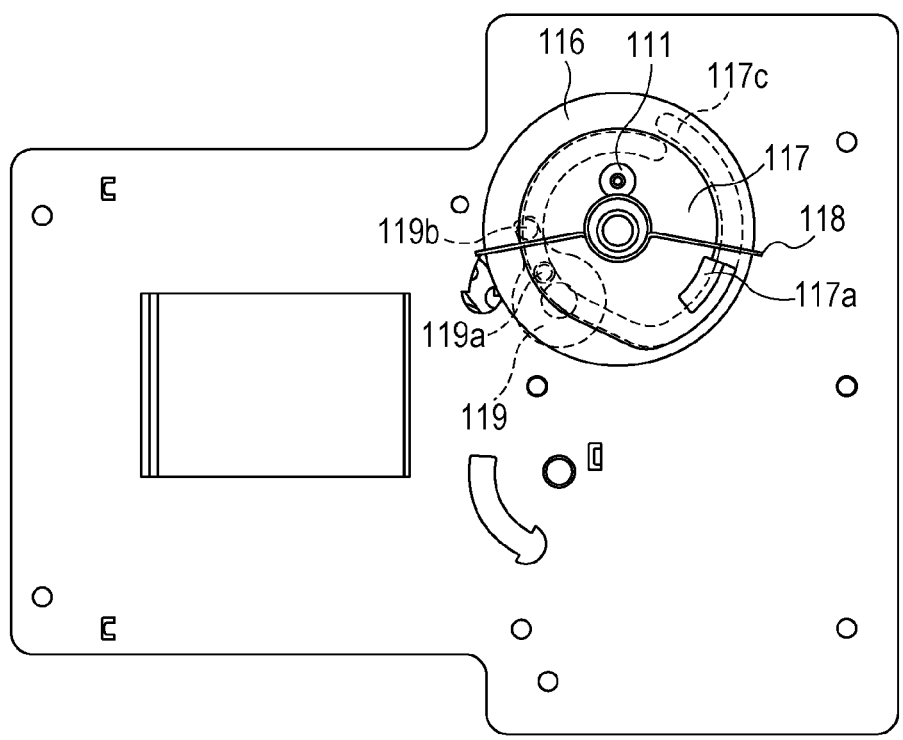

FIGS. 6A and 6B are illustrations for describing a state of the shutter unit 20 in D status. FIG. 6A is an illustration for describing the state of the first shutter driving mechanism. FIG. 6B is an illustration for describing the state of the second shutter driving mechanism.

As illustrated in FIG. 6A, the D status is a state immediately before the first blade 110 starts opening the aperture 105a. Because the first motor Ma is driven counterclockwise in the period from the C status to D status, the first rotor plate 107 is rotated clockwise by the driving force of the first motor Ma.

When the first rotor plate 107 rotates clockwise from the state illustrated in FIG. 5A (C status), the cam pin 109a in the first driving lever 109 follows the first idle running driving region A in the cam groove 107c in this period. Accordingly, the position of the first driving lever 109 in the state illustrated in FIG. 6A (D status) is substantially the same as the position of the first driving lever 109 in the state illustrated in FIG. 5A (C status).

As illustrated in FIG. 6B, in D status, the second blade 120 opens the aperture 105a. In the period from the C status to a state before the D status, because the second motor Mb is driven counterclockwise, the second rotor plate 117 is rotated clockwise by a combined force of the driving force of the second motor Mb and the urging force of the second spring 118. The urging force of the second spring 118 is provided to the second rotor plate 117 up to the state before the D status illustrated in FIG. 6B. That is, in D status illustrated in FIG. 6B, the urging force of the second spring 118 is not provided to the second rotor plate 117, and the second rotor plate 117 is rotated clockwise by only the driving force of the second motor Mb.

When the second rotor plate 117 rotates clockwise from the state illustrated in FIG. 5B (C status), the cam pin 119a in the second driving lever 119 also follows the first idle running driving region A in the cam groove 117c in this period. Accordingly, the position of the second driving lever 119 in the state illustrated in FIG. 6B (D status) is substantially the same as the position of the second driving lever 119 in the state illustrated in FIG. 5B (C status).

As illustrated in FIG. 12, in D status, the control circuit 13 controls the driving circuit 14a such that the first motor Ma is driven counterclockwise in feed-back driving mode with high advance angle. In D status, the control circuit 13 also controls the driving circuit 14b such that the second motor Mb is driven counterclockwise in step driving mode. Thus the shutter unit 20 moves to the E status illustrated in FIG. 12. The first shutter driving mechanism starts driving for exposure in feed-back driving mode with high advance angle in D status.

Figure 7A:
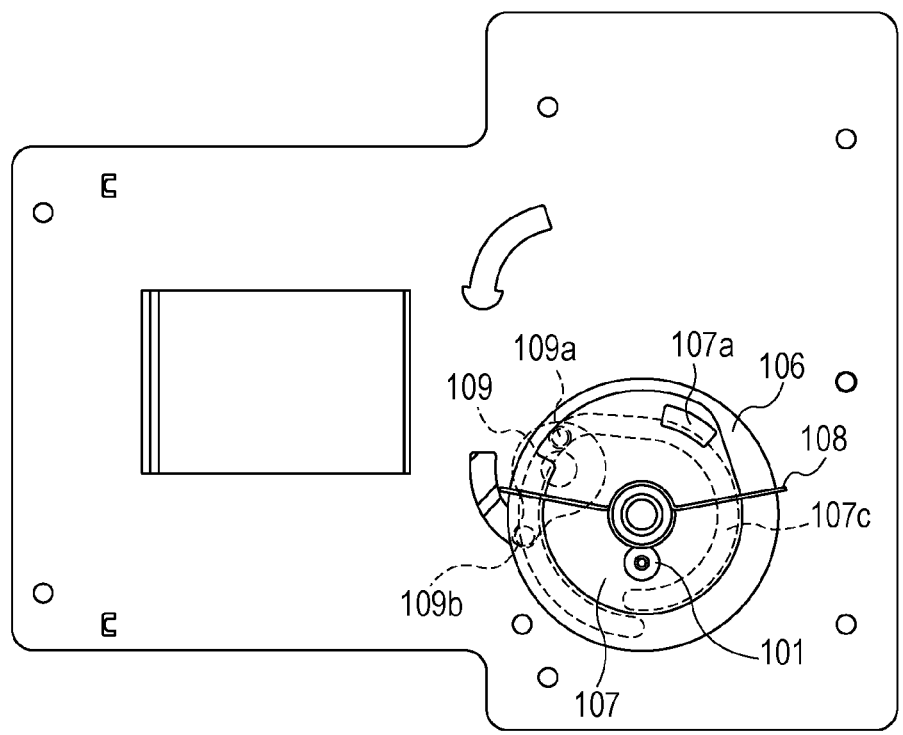
FIGS. 7A and 7B are illustrations for describing a state of the shutter unit 20 in E status.
Figure 7B:
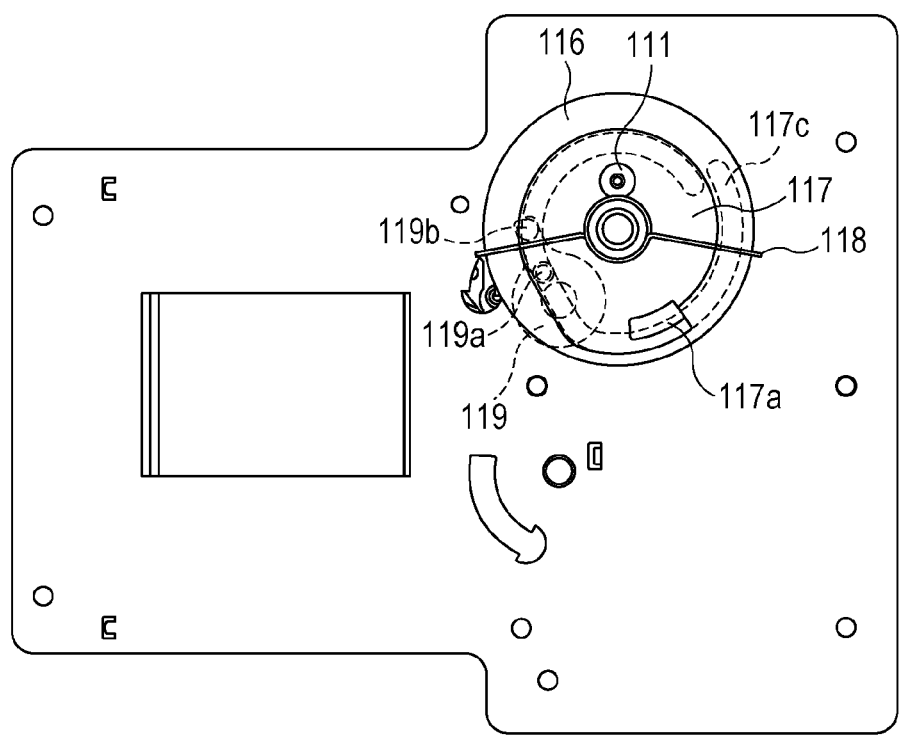

FIGS. 7A and 7B are illustrations for describing a state of the shutter unit 20 in E status. FIG. 7A is an illustration for describing the state of the first shutter driving mechanism. FIG. 7B is an illustration for describing the state of the second shutter driving mechanism.

As illustrated in FIG. 7A, in E status, the first blade 110 opens the aperture 105a. Because the first motor Ma is driven counterclockwise in the period from the D status to E status, the first rotor plate 107 is rotated clockwise by the driving force of the first motor Ma.

When the first rotor plate 107 rotates clockwise from the state illustrated in FIG. 6A (D status), the cam pin 109a in the first driving lever 109 follows the exposure driving region B in the cam groove 107c in this period. This causes the first blade 110 to open the closed aperture 105a. Accordingly, in exposure driving, it is necessary to drive the first motor Ma at high speeds, and this leads to large variations in load during the driving of the first motor Ma. At this time, because the first motor Ma is driven in feed-back driving mode with high advance angle, the high-speed driving and the load variations do not cause the first motor Ma to lose synchronization. Because the rotation speed of the first motor Ma is sufficiently high due to the driving for the approach run, the first motor Ma can be driven in feed-back driving mode with high advance angle.

As illustrated in FIG. 7B, the E status is a state immediately before the second blade 120 starts closing the aperture 105a. In the period from the D status to E status, because the second motor Mb is driven counterclockwise, the second rotor plate 117 is rotated clockwise by the driving force of the second motor Mb.

When the second rotor plate 117 rotates clockwise from the state illustrated in FIG. 6B (D status), the cam pin 119a in the second driving lever 119 follows the first idle running driving region A in the cam groove 117c in this period. Accordingly, the position of the second driving lever 119 in the state illustrated in FIG. 7B (E status) is substantially the same as the position of the second driving lever 119 in the state illustrated in FIG. 6B (D status).

As illustrated in FIG. 12, in E status, the control circuit 13 controls the driving circuit 14a such that the first motor Ma is driven counterclockwise in feed-back driving mode with high advance angle. In E status, the control circuit 13 also controls the driving circuit 14b such that the second motor Mb is driven counterclockwise in feed-back driving mode with high advance angle. Thus the shutter unit 20 moves to the F status illustrated in FIG. 12. The second shutter driving mechanism starts driving for exposure in feed-back driving mode with high advance angle in E status.

Figure 8A:
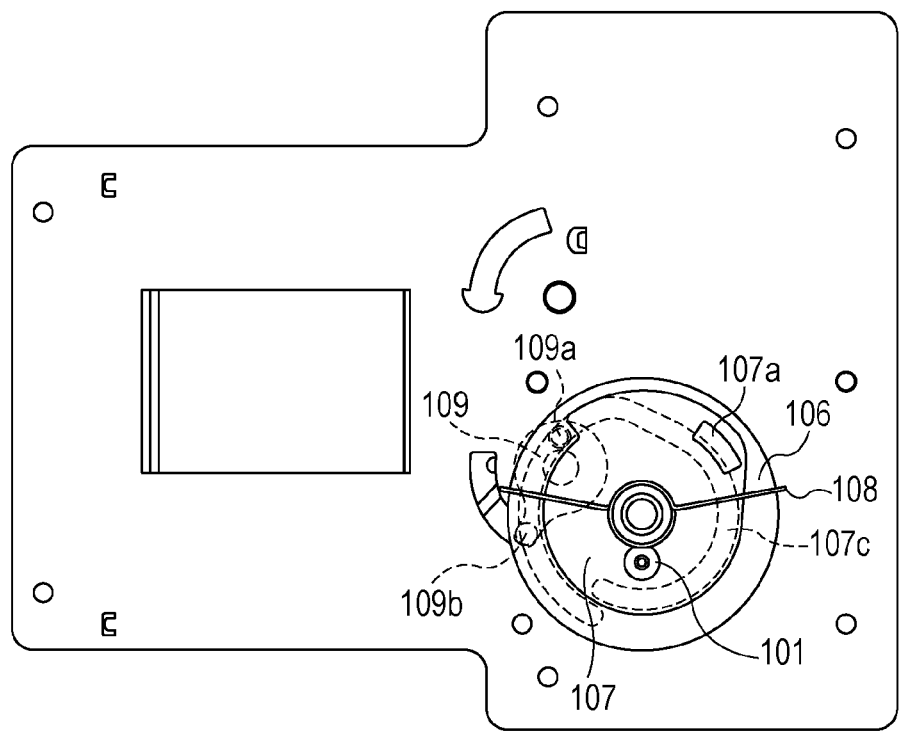
FIGS. 8A and 8B are illustrations for describing a state of the shutter unit 20 in F status.
Figure 8B:
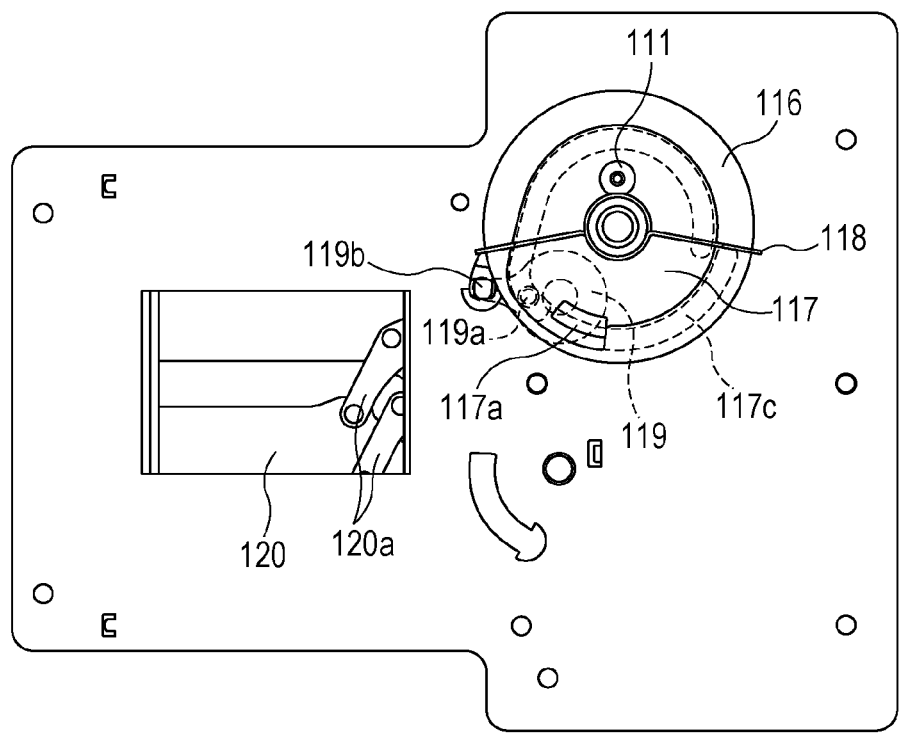

FIGS. 8A and 8B are illustrations for describing a state of the shutter unit 20 in F status. FIG. 8A is an illustration for describing the state of the first shutter driving mechanism. FIG. 8B is an illustration for describing the state of the second shutter driving mechanism.

As illustrated in FIG. 8A, in F status, the first blade 110 opens the aperture 105a. Because the first motor Ma is driven counterclockwise in the period from the D status to E status, the first rotor plate 107 is rotated clockwise by the driving force of the first motor Ma.

When the first rotor plate 107 rotates clockwise from the state illustrated in FIG. 7A (E status), the cam pin 109a in the first driving lever 109 follows the second idle running driving region C in the cam groove 107c in this period. Accordingly, the position of the first driving lever 109 in the state illustrated in FIG. 8A (F status) is substantially the same as the position of the first driving lever 109 in the state illustrated in FIG. 7A (E status).

As illustrated in FIG. 8B, in F status, the second blade 120 closes the aperture 105a. In the period from the E status to F status, because the second motor Mb is driven counterclockwise, the second rotor plate 117 is rotated clockwise by the driving force of the second motor Mb.

When the second rotor plate 117 rotates clockwise from the state illustrated in FIG. 7B (E status), the cam pin 119a in the second driving lever 119 follows the exposure driving region B in the cam groove 117c in this period. This causes the second blade 120 to close the opened aperture 105a. Accordingly, in exposure driving, it is necessary to drive the second motor Mb at high speeds, and this leads to large variations in load during the driving of the second motor Mb. At this time, because the second motor Mb is driven in feed-back driving mode with high advance angle, the high-speed driving and the load variations do not cause the second motor Mb to lose synchronization. Because the rotation speed of the second motor Mb is sufficiently high due to the driving for the approach run, the second motor Mb can be driven in feed-back driving mode with high advance angle.

As illustrated in FIG. 12, in F status, the control circuit 13 controls the driving circuit 14a such that the first motor Ma is driven counterclockwise in feed-back driving mode with high advance angle. In F status, the control circuit 13 also controls the driving circuit 14b such that the second motor Mb is driven counterclockwise in feed-back driving mode with high advance angle. Thus the shutter unit 20 moves to the G status illustrated in FIG. 12.

Figure 9A:
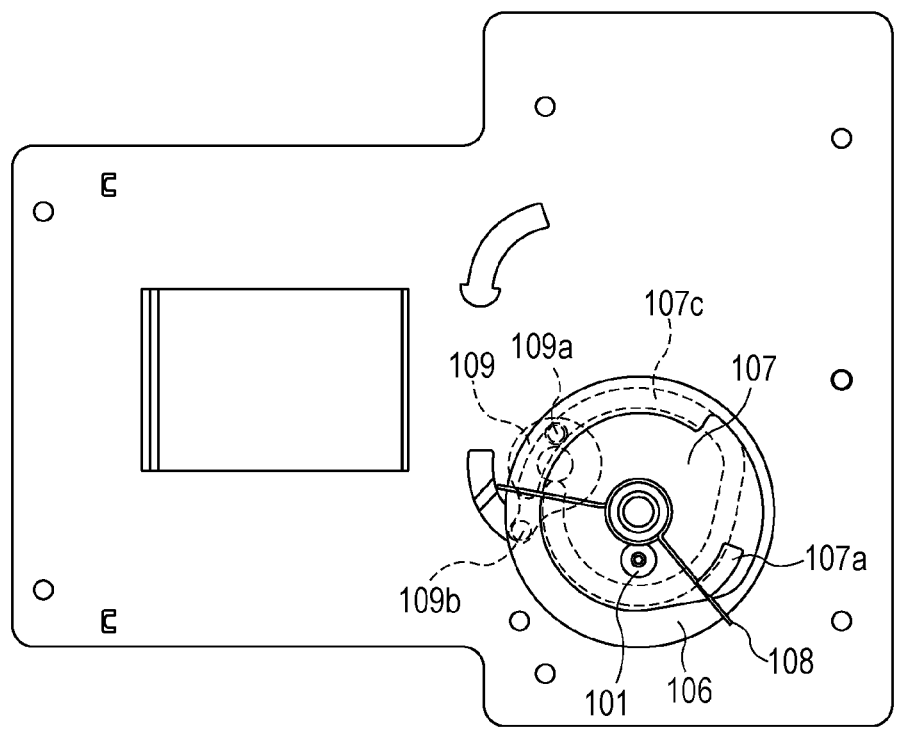
FIGS. 9A and 9B are illustrations for describing a state of the shutter unit 20 in G status.
Figure 9B:
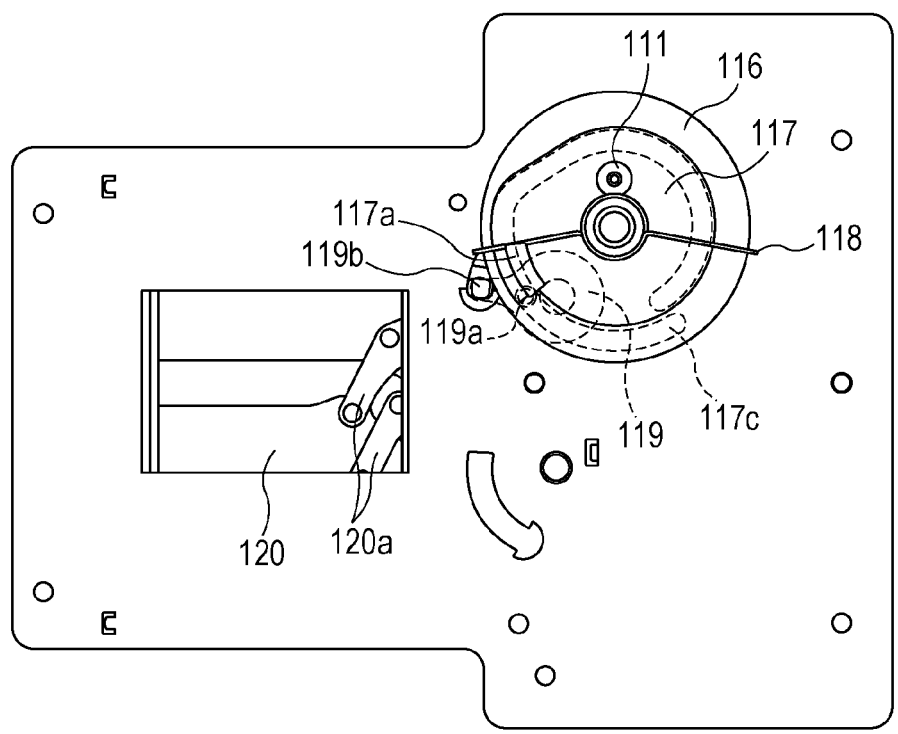

FIGS. 9A and 9B are illustrations for describing a state of the shutter unit 20 in G status. FIG. 9A is an illustration for describing the state of the first shutter driving mechanism. FIG. 9B is an illustration for describing the state of the second shutter driving mechanism.

As illustrated in FIG. 9A, in G status, the first blade 110 opens the aperture 105a. The first motor Ma is driven counterclockwise in the period from the F status to G status. In the period from the F status to G status, the protruding section 107a in the first rotor plate 107 is in contact with the right arm section of the first spring 108, and the first rotor plate 107 rotates clockwise while charging the first spring 108. That is, the first spring 108 acts to apply a break to the clockwise rotation of the first rotor plate 107. In the state illustrated in FIG. 9A, the first spring 108 is charged, and the first rotor plate 107 is urged in a counterclockwise direction by the first spring 108.

When the first rotor plate 107 rotates clockwise from the state illustrated in FIG. 8A (F status), the cam pin 109a in the first driving lever 109 follows the second idle running driving region C in the cam groove 107c in this period. Accordingly, the position of the first driving lever 109 in the state illustrated in FIG. 9A (G status) is substantially the same as the position of the first driving lever 109 in the state illustrated in FIG. 8A (F status). In this period, the first rotor plate 107 rotates clockwise while charging the first spring 108, and thus variations in load during the driving of the first motor Ma are large. However, because the first motor Ma is driven in feed-back driving mode with high advance angle, the first motor Ma does not lose synchronization.

As illustrated in FIG. 9B, in G status, the second blade 120 closes the aperture 105a. In the period from the F status to G status, because the second motor Mb is driven counterclockwise, the second rotor plate 117 is rotated clockwise by the driving force of the second motor Mb. In the state illustrated in FIG. 9B, the protruding section 117a in the second rotor plate 117 is in contact with the left arm section of the second spring 118. However, in this state, the second spring 118 is not charged and is in its natural state.

When the second rotor plate 117 rotates clockwise from the state illustrated in FIG. 8B (F status), the cam pin 119a in the second driving lever 119 also follows the second idle running driving region C in the cam groove 117c in this period. Accordingly, the position of the second driving lever 119 in the state illustrated in FIG. 9B (G status) is substantially the same as the position of the second driving lever 119 in the state illustrated in FIG. 8B (F status).

As illustrated in FIG. 12, in G status, the control circuit 13 controls the driving circuit 14a such that current supply to the first motor Ma is held. Here, holding the current supply indicates maintaining the phase of the current supply to the coil of the first motor Ma in G status. In G status, the control circuit 13 also controls the driving circuit 14b such that the second motor Mb is driven counterclockwise in feed-back driving mode with high advance angle. Thus the shutter unit 20 moves to the H status illustrated in FIG. 12.

Figure 10A:
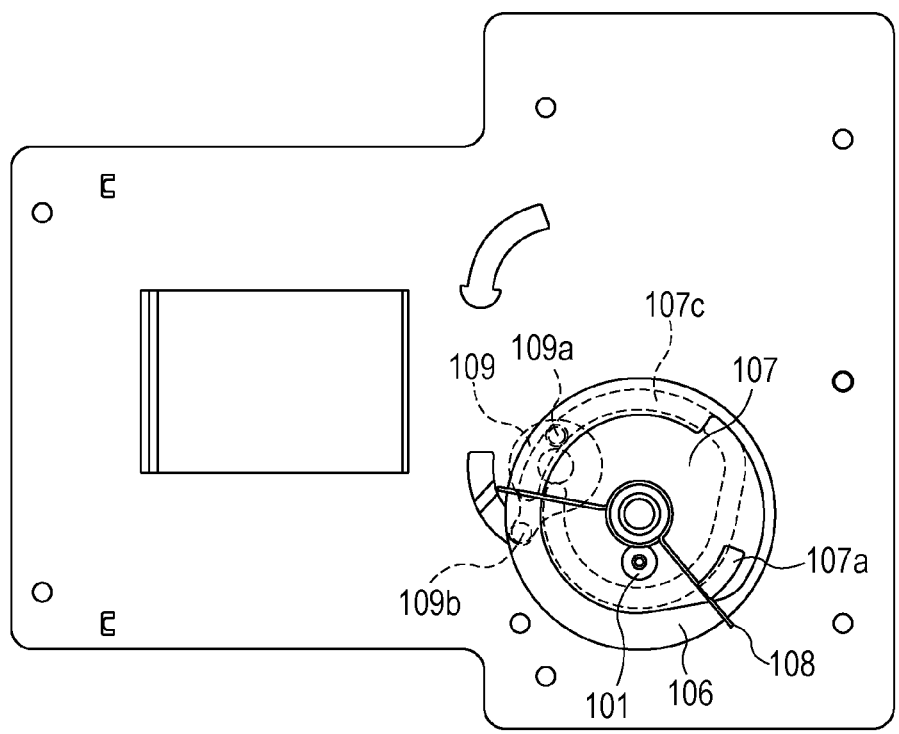
FIGS. 10A and 10B are illustrations for describing a state of the shutter unit 20 in H status.
Figure 10B:
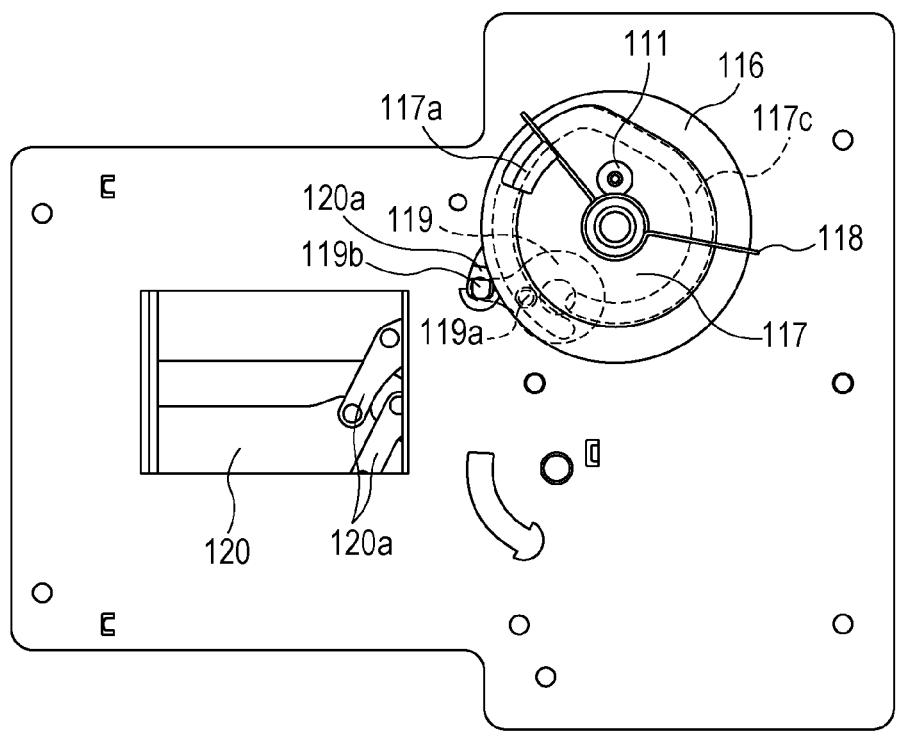

FIGS. 10A and 10B are illustrations for describing a state of the shutter unit 20 in H status. FIG. 10A is an illustration for describing the state of the first shutter driving mechanism. FIG. 10B is an illustration for describing the state of the second shutter driving mechanism.

As illustrated in FIG. 10A, in H status, the first blade 110 opens the aperture 105a. Because the current supply to the first motor Ma is held in G status, the first motor Ma and the first rotor plate 107 remain in G status. That is, the state illustrated in FIG. 10A (H status) is the same as the state illustrated in FIG. 9A (G status).

As illustrated in FIG. 10B, in H status, the second blade 120 closes the aperture 105a. In the period from the G status to H status, the second motor Mb is driven counterclockwise. In the period from the G status to H status, the protruding section 117a in the second rotor plate 117 is in contact with the left arm section of the second spring 118, and the second rotor plate 117 rotates clockwise while charging the second spring 118. That is, the second spring 118 acts to apply a break to the clockwise rotation of the second rotor plate 117. In the state illustrated in FIG. 10B, the second spring 118 is charged, and the second rotor plate 117 is urged in a counterclockwise direction by the second spring 118.

When the second rotor plate 117 rotates clockwise from the state illustrated in FIG. 9B (G status), the cam pin 119a in the second driving lever 119 follows the second idle running driving region C in the cam groove 117c in this period. Accordingly, the position of the second driving lever 119 in the state illustrated in FIG. 10B (H status) is substantially the same as the position of the second driving lever 119 in the state illustrated in FIG. 9B (G status). In this period, the second rotor plate 117 rotates clockwise while charging the second spring 118, and thus variations in load during the driving of the second motor Mb are large. However, because the second motor Mb is driven in feed-back driving mode with high advance angle, the second motor Mb does not lose synchronization.

As described above, the shutter unit 20 according to the present embodiment performs the first-frame shooting operation from the A status to H status illustrated in FIG. 12. In the first-frame shooting operation, the first shutter driving mechanism functions as the leading blade, and the second shutter driving mechanism functions as the trailing blade. In the second-frame shooting operation, the second shutter driving mechanism functions as the leading blade, and the first shutter driving mechanism functions as the trailing blade. That is, in the first-frame shooting operation, the first shutter driving mechanism performs an exposure operation ahead of the second shutter driving mechanism. In the second-frame shooting operation, the second shutter driving mechanism performs an exposure operation ahead of the first shutter driving mechanism.

In the present embodiment, the start of driving for an approach run in the first shutter driving mechanism is caused to lag behind the start of driving for an approach run in the second shutter driving mechanism by an exposure time t2 for the second frame by adjustment of the period of time for which the current supply to the first motor Ma is held.

As illustrated in FIG. 12, in H status, the control circuit 13 controls the driving circuit 14a such that the current supply to the first motor Ma is held. In H status, the control circuit 13 also controls the driving circuit 14b such that the second motor Mb is driven clockwise in step driving mode. Thus the second rotor plate 117 is rotated counterclockwise by the driving force of the second motor Mb and the urging force of the second spring 118. The second shutter driving mechanism starts driving for an approach run in step driving mode in H status. Thus the shutter unit 20 moves to the G' status illustrated in FIG. 12.

The state of the shutter unit 20 in G' status illustrated in FIG. 12 is the same as the state illustrated in FIGS. 9A and 9B.

As illustrated in FIG. 12, in G' status, the control circuit 13 controls the driving circuit 14a such that the first motor Ma is driven clockwise in step driving mode. Thus the first rotor plate 107 is rotated counterclockwise by the driving force of the first motor Ma and the urging force of the first spring 108. The first shutter driving mechanism starts driving for an approach run in step driving mode in G' status. In G' status, the control circuit 13 controls the driving circuit 14b such that the second motor Mb is driven clockwise in step driving mode. Thus the shutter unit 20 moves to the F' status illustrated in FIG. 12.

The state of the shutter unit 20 in F' status illustrated in FIG. 12 is the same as the state illustrated in FIGS. 8A and 8B.

As illustrated in FIG. 12, in F' status, the control circuit 13 controls the driving circuit 14a such that the first motor Ma is driven clockwise in step driving mode. In F' status, the control circuit 13 controls the driving circuit 14b such that the second motor Mb is driven clockwise in feed-back driving mode with high advance angle. Thus the shutter unit 20 moves to the E' status illustrated in FIG. 12. The second shutter driving mechanism starts driving for exposure in feed-back driving mode with high advance angle in F' status. Because the rotation speed of the second motor Mb is sufficiently high due to the driving for the approach run, the second motor Mb can be driven in feed-back driving mode with high advance angle.

The state of the shutter unit 20 in F' status illustrated in FIG. 12 is the same as the state illustrated in FIG. 8.

As illustrated in FIG. 12, in E' status, the control circuit 13 controls the driving circuit 14a such that the first motor Ma is driven clockwise in feed-back driving mode with high advance angle. In E' status, the control circuit 13 controls the driving circuit 14b such that the second motor Mb is driven clockwise in feed-back driving mode with high advance angle. Thus the shutter unit 20 moves to the D' status illustrated in FIG. 12. The first shutter driving mechanism starts driving for exposure in feed-back driving mode with high advance angle in E' status. Because the rotation speed of the first motor Ma is sufficiently high due to the driving for the approach run, the first motor Ma can be driven in feed-back driving mode with high advance angle.

The state of the shutter unit 20 in E' status illustrated in FIG. 12 is the same as the state illustrated in FIGS. 7A and 7B.

As illustrated in FIG. 12, in D' status, the control circuit 13 controls the driving circuit 14a such that the first motor Ma is driven clockwise in feed-back driving mode with high advance angle. In D' status, the control circuit 13 controls the driving circuit 14b such that the second motor Mb is driven clockwise in feed-back driving mode with high advance angle. Thus the shutter unit 20 moves to the C' status illustrated in FIG. 12.

The state of the shutter unit 20 in C' status illustrated in FIG. 12 is the same as the state illustrated in FIGS. 6A and 6B.

As illustrated in FIG. 12, in C' status, the control circuit 13 controls the driving circuit 14a such that the first motor Ma is driven clockwise in feed-back driving mode with high advance angle. In C' status, the control circuit 13 controls the driving circuit 14b such that the current supply to the second motor Mb is held. Here, holding the current supply indicates maintaining the phase of the current supply to the second motor Mb in D status. Thus the shutter unit 20 moves to the I status illustrated in FIG. 12.

FIGS. 11A and 11B are illustrations for describing a state of the shutter unit 20 in I status. FIG. 11A is an illustration for describing the state of the first shutter driving mechanism. FIG. 11B is an illustration for describing the state of the second shutter driving mechanism.

As illustrated in FIG. 11A, in I status, the first blade 110 closes the aperture 105a. As illustrated in FIG. 12, because the first motor Ma is driven clockwise in the period from the C' status to I status, the first rotor plate 107 is rotated counterclockwise from the state illustrated in FIG. 5A. In the period from the C' status to I status, the protruding section 107a in the first rotor plate 107 is in contact with the left arm section of the first spring 108, and the first rotor plate 107 rotates counterclockwise while charging the first spring 108. That is, the first spring 108 acts to apply a break to the counterclockwise rotation of the first rotor plate 107. In the state illustrated in FIG. 11A, the first spring 108 is charged, and the first rotor plate 107 is urged in a clockwise direction by the first spring 108.

As illustrated in FIG. 11B, in I status, the second blade 120 opens the aperture 105a. Because the current supply to the second motor Mb is held in C' status, the second motor Mb and the second rotor plate 117 remain in C' status. That is, the state illustrated in FIG. 5B is the same as the state illustrated in FIG. 11B.

As described above, the shutter unit 20 according to the present embodiment performs the second-frame shooting operation from the H status to I status illustrated in FIG. 12. In the second-frame shooting operation, the second shutter driving mechanism functions as the leading blade, and the first shutter driving mechanism functions as the trailing blade. In the third-frame shooting operation, the first shutter driving mechanism functions as the leading blade, and the second shutter driving mechanism functions as the trailing blade. In the present embodiment, the start of driving for an approach run in the second shutter driving mechanism is caused to lag behind the start of driving for an approach run in the first shutter driving mechanism by an exposure time t3 for the third frame by adjustment of the period of time for which the current supply to the second motor Mb is held.

As illustrated in FIG. 12, in I status, the control circuit 13 controls the driving circuit 14a such that the first motor Ma is driven counterclockwise in step driving mode. The control circuit 13 controls the driving circuit 14b such that the current supply to the second motor Mb is held. Thus the shutter unit 20 moves to the C status illustrated in FIG. 12.

After that, the same shooting operation as that for the first frame is performed.

(Variation)

Figure 13:
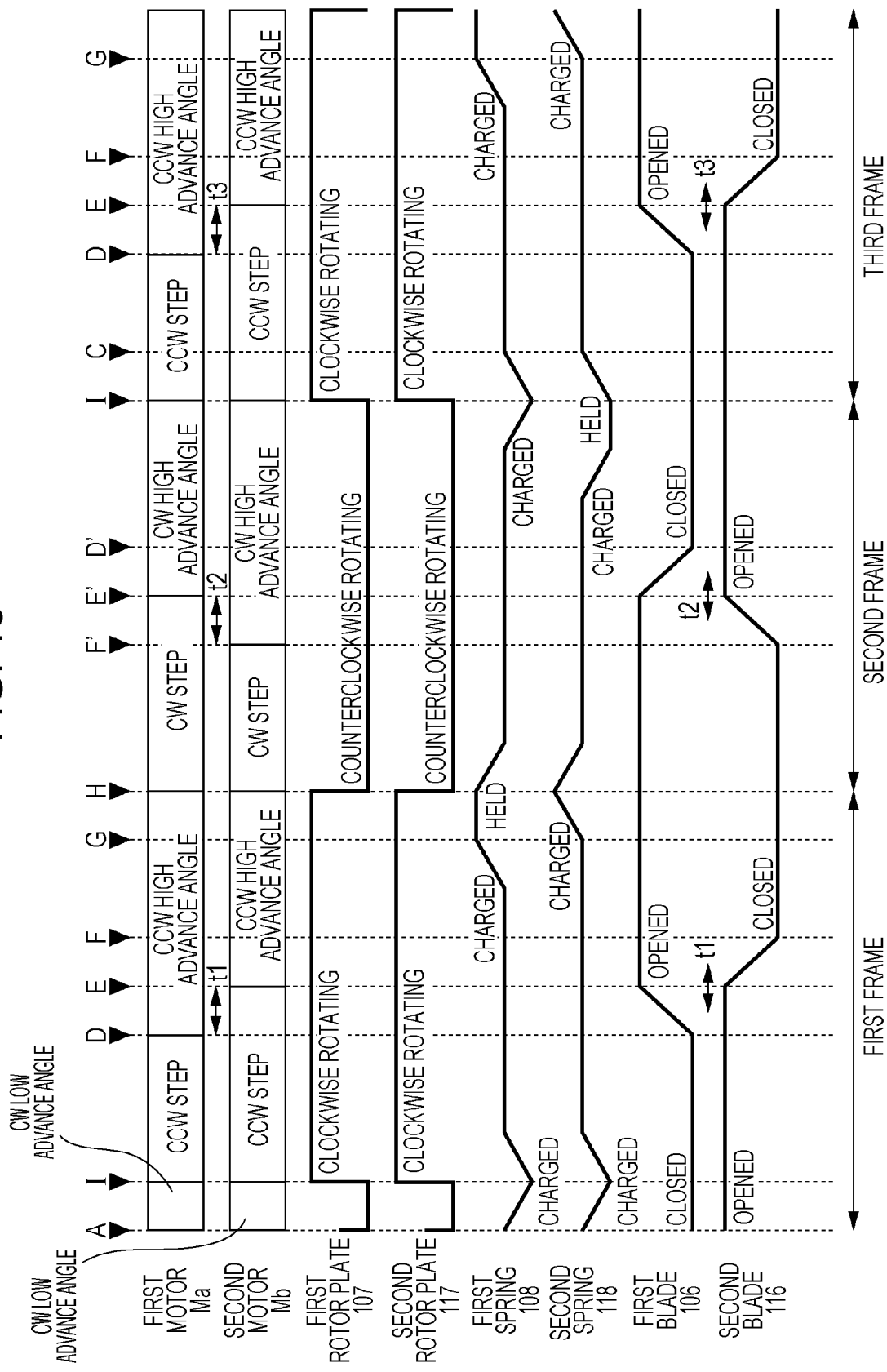
FIG. 13 is a timing chart for describing operations of the shutter unit 20 when the camera 100 is operating in continuous shooting mode as a variation of the embodiment.

FIG. 13 is a timing chart for describing operations of the shutter unit 20 when the camera 100 is operating in continuous shooting mode as a variation of the present embodiment.

In the above-described embodiment, a lag between the leading blade and the trailing blade is produced by making the timing for starting the driving for the approach run in the shutter driving mechanism functioning as the leading blade and the timing for starting the driving for the approach run in the shutter driving mechanism functioning as the trailing blade different.

In contrast, in the variation, a lag between the leading blade and the trailing blade is produced by making a pulse rate for the driving for the approach run in the shutter driving mechanism functioning as the leading blade and a pulse rate for the driving for the approach run in the shutter driving mechanism functioning as the trailing blade different. That is, the pulse rate for the driving for the approach run in the shutter driving mechanism functioning as the leading blade is set at a value larger than the pulse rate for the driving for the approach run in the shutter driving mechanism functioning as the trailing blade. Thus even in the same approach run period, the time required for the driving for the approach run in the shutter driving mechanism functioning as the trailing blade is longer than the time required for the driving for the approach run in the shutter driving mechanism functioning as the leading blade.

In the variation, in A status illustrated in FIG. 13, the control circuit 13 controls the driving circuit 14a such that the first motor Ma is driven clockwise in feed-back driving mode with low advance angle. In A status illustrated in FIG. 13, the control circuit 13 controls the driving circuit 14b such that the second motor Mb is driven clockwise in feed-back driving mode with low advance angle. Thus the shutter unit 20 moves to the I status illustrated in FIG. 13.

In I status illustrated in FIG. 13, the control circuit 13 controls the driving circuit 14a such that the first motor Ma is driven counterclockwise in step driving mode. In I status illustrated in FIG. 13, the control circuit 13 controls the driving circuit 14b such that the second motor Mb is driven counterclockwise in step driving mode. Thus the shutter unit 20 moves to the D status illustrated in FIG. 13.

The state from the D status to G status illustrated in FIG. 13 is the same as that from the D status to G status illustrated in FIG. 12 in the embodiment described above.

In G status illustrated in FIG. 13, the control circuit 13 also controls the driving circuit 14a such that the first motor Ma is driven counterclockwise in feed-back driving mode with high advance angle. In D status illustrated in FIG. 13, the control circuit 13 also controls the driving circuit 14b such that the second motor Mb is driven counterclockwise in feed-back driving mode with high advance angle.

In the above-described embodiment, in G status illustrated in FIG. 12, the control circuit 13 controls the driving circuit 14a such that the current supply to the first motor Ma is held. In the variation, the control circuit 13 controls the driving circuit 14a such that the first motor Ma is driven counterclockwise in feed-back driving mode with high advance angle. Accordingly, although the first rotor plate 107 tries to rotate clockwise, because the protruding section 107a in the first rotor plate 107 comes into contact with the stopper on the cover plate 103, the clockwise rotation of the first rotor plate 107 is blocked.

The characteristics in the variation are substantially the same as those in the above-described embodiment, except for the method of producing a lag between the leading blade and the trailing blade and the respect in which holding the current supply is not performed.

Next, the details of the first motor Ma and the second motor Mb are described with reference to FIGS. 14 to 16.

Figure 14:
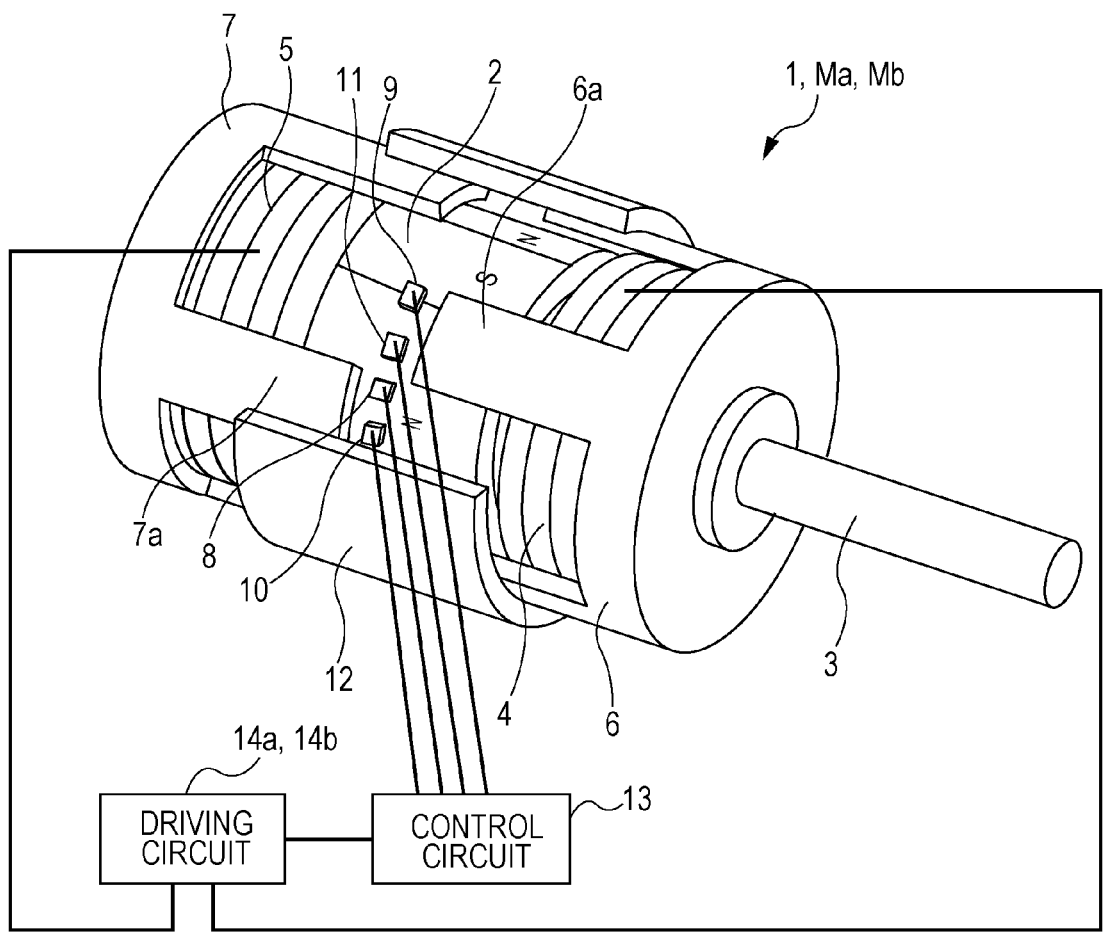
FIG. 14 illustrates a motor 1 used as each of a first motor Ma and a second motor Mb.

FIG. 14 illustrates a motor 1 used as each of the first motor Ma and the second motor Mb. For the sake of the description, parts of some components are removed in the illustration.

As illustrated in FIG. 14, a rotor 3 includes a magnet 2 and is rotatably controlled by the control circuit (controller) 13 and the driving circuit 14. The magnet 2 is cylindrical, has a circumferential surface divided in its circumferential direction, and is multipole-magnetized in different poles in an alternatingly manner. In the present embodiment, the magnet 2 is divided in eight elements, that is, magnetized in eight poles. The number of divisions is not limited to eight. The magnet 2 may be magnetized in four or twelve poles.

A first coil 4 is arranged on a first end of the magnet 2 in its axial direction.

A first yoke 6 is made of a soft magnetic material and is opposed to the circumferential surface of the magnet 2 such that a gap is present therebetween. The first yoke 6 axially extends from an annular main body portion and includes a plurality of first magnetic pole sections 6a arranged at predetermined intervals in its circumferential direction. The first magnetic pole sections 6a are excited by energization of the first coil 4.

The first coil 4, the first yoke 6, and the magnet 2 opposed to the plurality of first magnetic pole sections 6a constitute a first stator unit.

A second coil 5 is arranged on a second end of the magnet 2 in its axial direction, and the second end is opposite to the first end on which the first coil 4 is arranged.

A second yoke 7 is made of a soft magnetic material and is opposed to the circumferential surface of the magnet 2 such that a gap is present therebetween. The second yoke 7 axially extends from the annular main body portion and includes a plurality of second magnetic pole sections 7a arranged at predetermined intervals in its circumferential direction. The second magnetic pole sections 7a are excited by energization of the second coil 5.

The second coil 5, the second yoke 7, and the magnet 2 opposed to the plurality of second magnetic pole sections 7a constitute a second stator unit.

A torque provided to the rotor 3 can be changed by switching the magnetized polarity (north pole, south pole) of each of the first magnetic pole sections 6a and the second magnetic pole sections 7a.

A first magnetic sensor (first detecting element) 8, a second magnetic sensor (second detecting element) 9, a third magnetic sensor (third detecting element) 10, and a fourth magnetic sensor (fourth detecting element) 11 constitute detecting means. Each of the magnetic sensors is a Hall element configured to detect a magnetic flux of the magnet 2 and is fixed to a motor cover 12.

The motor cover 12 fixes and retains the first yoke 6 and the second yoke 7 such that the first magnetic pole sections 6a and the second magnetic pole sections 7a are displaced with respect to a magnetization phase of the magnet 2 by approximately 90 degrees in electrical angle.

Here, the electrical angle is an angle represented based on the assumption that one cycle of the magnetic force of the magnet is 360°. The electrical angle θ can be expressed by the following equation:

$$\theta = \theta 0 \times M/2$$

where M is the number of poles of the rotor, and the mechanical angle is θ0.

In the present embodiment, the magnet 2 is magnetized in eight poles, and 90 degrees in electrical angle is 22.5 degrees in mechanical angle.

The control circuit 13 can switch the driving among the step driving and the two kinds of feed-back driving with different amounts of the advance angle. In step driving, the control circuit 13 controls the driving circuit 14 such that the energization state of the first coil 4 and the second coil 5 is switched at predetermined time intervals. That is, in step driving, none of outputs of the first magnetic sensor 8, the second magnetic sensor 9, the third magnetic sensor 10, and the fourth magnetic sensor 11 are used.

A case where the control circuit 13 performs the feed-back driving is described below. When the control circuit 13 performs the two kinds of feed-back driving, outputs of the first magnetic sensor 8, the second magnetic sensor 9, the third magnetic sensor 10, and the fourth magnetic sensor 11 are used.

In the present embodiment, even in switching the energization direction, a large rotational driving force is obtainable by arranging each magnetic sensor in a positional relationship with respect to each yoke described below.

Figure 15A:
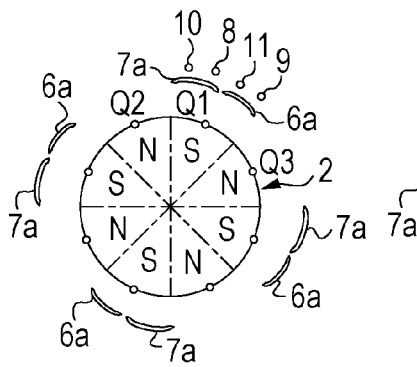
FIGS. 15A to 15I are illustrations for describing operations of the motor.

FIGS. 15A to 15I are illustrations for describing operations of the motor 1. Actual operations of the motor 1 are described with reference to FIGS. 15A to 15I. The state in FIG. 15A is described as an initial state in driving.

(1) Clockwise Driving (1-i) Low Advance Angle Driving (First Energization Mode)

The clockwise driving mode with low advance angle is described. The driving mode with low advance angle can achieve larger torque than that in the driving mode with high advance angle described below.

In the clockwise driving mode with low advance angle, the rotor 3 is rotated clockwise by switching excitation of each of the first magnetic pole sections 6a in response to an output signal of the first magnetic sensor 8 and switching excitation of each of the second magnetic pole sections 7a in response to an output signal of the second magnetic sensor 9. The direction of the clockwise rotation of the rotor 3 corresponds to a first rotation direction.

In this driving mode, the energization direction of each of the first coil 4 and the second coil 5 is switched using combinations described below.

When the first magnetic sensor 8 detects the south pole of the magnet 2 (switching from the north pole to south pole), its detection signal is input into the control circuit 13. The control circuit 13 controls the driving circuit 14 such that the first magnetic pole section 6a is magnetized with the north pole. When the first magnetic sensor 8 detects the north pole of the magnet 2 (switching from the south pole to north pole), its detection signal is input into the control circuit 13. The control circuit 13 controls the driving circuit 14 such that the first magnetic pole section 6a is magnetized with the south pole.

When the second magnetic sensor 9 detects the south pole of the magnet 2 (switching from the north pole to south pole), its detection signal is input into the control circuit 13. The control circuit 13 controls the driving circuit 14 such that the second magnetic pole section 7a is magnetized with the south pole. When the second magnetic sensor 9 detects the north pole of the magnet 2 (switching from the south pole to north pole), its detection signal is input into the control circuit 13. The control circuit 13 controls the driving circuit 14 such that the second magnetic pole section 7a is magnetized with the north pole.

In the state illustrated in FIG. 15A, both the first magnetic sensor 8 and the second magnetic sensor 9 detect the south pole of the magnet 2. At this time, the control circuit 13 controls the driving circuit 14 such that the first magnetic pole section 6a is magnetized with the north pole and the second magnetic pole section 7a is magnetized with the south pole. This produces a clockwise rotation force in the rotor 3 and the magnet 2.

Figure 15B:
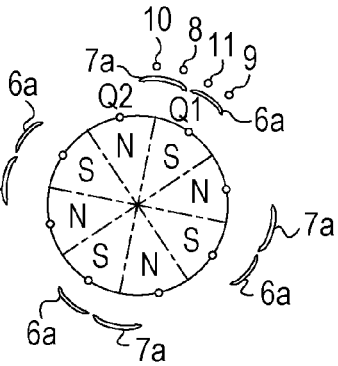

When the rotor 3 rotates clockwise from the state illustrated in FIG. 15A, the center Q1 of each of the south poles of the magnet 2 and the center of the corresponding first magnetic pole section 6a are opposed to each other, as illustrated in FIG. 15B.

Figure 15C:
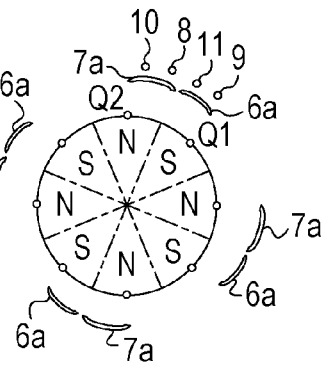

When the rotor 3 rotates clockwise from the state illustrated in FIG. 15B, the distance between the center Q1 of the south pole of the magnet 2 and the first magnetic pole section 6a is the same as the distance between the center Q2 of each of the north poles of the magnet 2 and the corresponding second magnetic pole section 7a, as illustrated in FIG. 15C.

The first magnetic sensor 8 is arranged such that when the magnetized polarity of the first magnetic pole section 6a is switched on the basis of the output of the first magnetic sensor 8, the excitation switching timing for the first magnetic pole section 6a with respect to the rotation position of the rotor 3 corresponds to an electrical advance angle between angle 0 degree to 45 degrees.

The first magnetic sensor 8 detects the north pole of the magnet 2 (switching from the south pole to north pole) between the state illustrated in FIG. 15B and the state illustrated in FIG. 15C. At this time, the driving circuit 14 energizes the first coil 4 such that the first magnetic pole section 6a is magnetized with the south pole. Because the second magnetic sensor 9 detects the south pole of the magnet 2 between the state illustrated in FIG. 15B and the state illustrated in FIG. 15C, the driving circuit 14 energizes the second coil 5 such that the second magnetic pole section 7a is magnetized with the south pole. This produces the clockwise rotation force in the rotor 3 and the magnet 2.

Figure 15D:
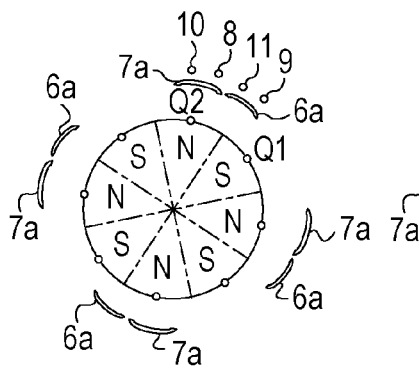

When the rotor 3 rotates clockwise from the state illustrated in FIG. 15C, the center Q2 of the north pole of the magnet 2 and the center of the second magnetic pole section 7a are opposed to each other, as illustrated in FIG. 15D.

Figure 15E:
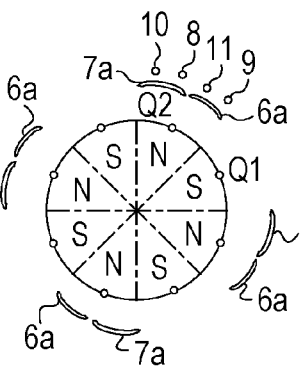

When the rotor 3 rotates clockwise from the state illustrated in FIG. 15D, the distance between the center Q2 of the north pole of the magnet 2 and the first magnetic pole section 6a is the same as the distance between the center Q2 of the north pole of the magnet 2 and the second magnetic pole section 7a, as illustrated in FIG. 15E.

The second magnetic sensor 9 is arranged such that when the magnetized polarity of the second magnetic pole section 7a is switched on the basis of the output of the second magnetic sensor 9, the excitation switching timing for the second magnetic pole section 7a with respect to the rotation position of the rotor 3 corresponds to an electrical advance angle between 0 degree to 45 degrees.

The second magnetic sensor 9 detects the north pole of the magnet 2 (switching from the south pole to north pole) between the state illustrated in FIG. 15D and the state illustrated in FIG. 15E. At this time, the driving circuit 14 energizes the second coil 5 such that the second magnetic pole section 7a is magnetized with the north pole. Because the first magnetic sensor 8 detects the north pole of the magnet 2 between the state illustrated in FIG. 15D and the state illustrated in FIG. 15E, the driving circuit 14 energizes the first coil 4 such that the first magnetic pole section 6a is magnetized with the south pole. This produces the clockwise rotation force in the rotor 3 and the magnet 2.

As described above, in the clockwise driving mode with low advance angle, the energization of the first coil 4 and the second coil 5 is sequentially switched by the outputs of the first magnetic sensor 8 and the second magnetic sensor 9, and the rotor 3 and the magnet 2 rotate in a clockwise direction.

When the rotor 3 rotates clockwise and the magnetized polarity of the first magnetic pole section 6a is switched on the basis of the output of the first magnetic sensor 8, the excitation switching timing for the first magnetic pole section 6a with respect to the rotation position of the rotor 3 corresponds to an electrical advance angle between angle 0 degree to 45 degrees. That is, the first magnetic sensor 8 is arranged in a position where the amount of the advance angle from the position of the electrical advance angle 0 degree from the excitation switching timing at the first magnetic pole section 6a is smaller than the amount of the lag angle from the position of the electrical advance angle 90 degrees from the excitation switching timing at the first magnetic pole section 6a.

When the rotor 3 rotates clockwise and the magnetized polarity of the second magnetic pole section 7a is switched on the basis of the output of the second magnetic sensor 9, the excitation switching timing for the second magnetic pole section 7a with respect to the rotation position of the rotor 3 corresponds to an electrical advance angle between angle 0 degree to 45 degrees. That is, the second magnetic sensor 9 is arranged in a position where the amount of the advance angle from the position of the electrical advance angle 0 degree from the excitation switching timing at the second magnetic pole section 7a is smaller than the amount of the lag angle from the position of the electrical advance angle 90 degrees from the excitation switching timing at the second magnetic pole section 7a.

(1-ii) High Advance Angle Driving (Second Energization Mode)

The clockwise driving mode with high advance angle is described. The driving mode with high advance angle can achieve higher speed rotation than that in the above-described driving mode with low advance angle.

In the clockwise driving mode with high advance angle, the rotor 3 is rotated clockwise by switching the magnetized polarity of the first magnetic pole section 6a in response to the output of the third magnetic sensor 10 and switching the magnetized polarity of the second magnetic pole section 7a in response to the output of the fourth magnetic sensor 11.

In this driving mode, the energization direction of each of the first coil 4 and the second coil 5 is switched using combinations described below.

When the third magnetic sensor 10 detects the south pole of the magnet 2 (switching from the north pole to south pole), its detection signal is input into the control circuit 13. The control circuit 13 controls the driving circuit 14 such that the first magnetic pole section 6a is magnetized with the north pole. When the third magnetic sensor 10 detects the north pole of the magnet 2 (switching from the south pole to north pole), its detection signal is input into the control circuit 13. The control circuit 13 controls the driving circuit 14 such that the first magnetic pole section 6a is magnetized with the south pole.

When the fourth magnetic sensor 11 detects the south pole of the magnet 2 (switching from the north pole to south pole), its detection signal is input into the control circuit 13. The control circuit 13 controls the driving circuit 14 such that the second magnetic pole section 7a is magnetized with the south pole. When the fourth magnetic sensor 11 detects the north pole of the magnet 2 (switching from the south pole to north pole), its detection signal is input into the control circuit 13. The control circuit 13 controls the driving circuit 14 such that the second magnetic pole section 7a is magnetized with the north pole.

In the state illustrated in FIG. 15A, both the third magnetic sensor 10 and the fourth magnetic sensor 11 detect the south pole of the magnet 2. Accordingly, when the first magnetic pole section 6a is magnetized with the north pole and the second magnetic pole section 7a is magnetized with the south pole, a clockwise rotation force is produced in the rotor 3 and the magnet 2.

When the rotor 3 rotates clockwise from the state illustrated in FIG. 15A, the center Q1 of each of the south poles of the magnet 2 and the center of the corresponding first magnetic pole section 6a are opposed to each other, as illustrated in FIG. 15B.

The third magnetic sensor 10 is arranged such that when the magnetized polarity of the first magnetic pole section 6a is switched on the basis of the output of the third magnetic sensor 10, the excitation switching timing for the first magnetic pole section 6a with respect to the rotation position of the rotor 3 corresponds to an electrical advance angle between angle 45 degrees to 90 degrees.

The third magnetic sensor 10 detects the north pole of the magnet 2 (switching from the south pole to north pole) between the state illustrated in FIG. 15A and the state illustrated in FIG. 15B. At this time, the driving circuit 14 energizes the first coil 4 such that the first magnetic pole section 6a is magnetized with the south pole. Because the fourth magnetic sensor 11 detects the south pole of the magnet 2 between the state illustrated in FIG. 15A and the state illustrated in FIG. 15B, the driving circuit 14 energizes the second coil 5 such that the second magnetic pole section 7a is magnetized with the south pole. This produces the clockwise rotation force in the rotor 3 and the magnet 2.

When the rotor 3 rotates clockwise from the state illustrated in FIG. 15B, the state moves to the state illustrated in FIG. 15C, and then the center Q2 of the north pole of the magnet 2 and the center of the second magnetic pole section 7a are opposed to each other, as illustrated in FIG. 15D.

The fourth magnetic sensor 11 is arranged such that when the magnetized polarity of the second magnetic pole section 7a is switched on the basis of the output of the fourth magnetic sensor 11, the excitation switching timing for the second magnetic pole section 7a with respect to the rotation position of the rotor 3 corresponds to an electrical advance angle between 45 degrees to 90 degrees.

The fourth magnetic sensor 11 detects the north pole of the magnet 2 (switching from the south pole to north pole) between the state illustrated in FIG. 15C and the state illustrated in FIG. 15D. At this time, the driving circuit 14 energizes the second coil 5 such that the second magnetic pole section 7a is magnetized with the north pole. Because the third magnetic sensor 10 detects the north pole of the magnet 2 between the state illustrated in FIG. 15C and the state illustrated in FIG. 15D, the driving circuit 14 energizes the first coil 4 such that the first magnetic pole section 6a is magnetized with the south pole. This produces the clockwise rotation force in the rotor 3 and the magnet 2.

As described above, in the clockwise driving mode with high advance angle, the energization of the first coil 4 and the second coil 5 is sequentially switched by the outputs of the third magnetic sensor 10 and the fourth magnetic sensor 11, and the rotor 3 and the magnet 2 rotate in a clockwise direction.

When the rotor 3 rotates clockwise and the magnetized polarity of the first magnetic pole section 6a is switched on the basis of the output of the third magnetic sensor 10, the excitation switching timing for the first magnetic pole section 6a with respect to the rotation position of the rotor 3 corresponds to an electrical advance angle between angle 45 degrees to 90 degrees. That is, the third magnetic sensor 10 is arranged in a position where the amount of the advance angle from the position of the electrical advance angle 0 degree from the excitation switching timing at the first magnetic pole section 6a is larger than the amount of the lag angle from the position of the electrical advance angle 90 degrees from the excitation switching timing at the first magnetic pole section 6a.

When the rotor 3 rotates clockwise and the magnetized polarity of the second magnetic pole section 7a is switched on the basis of the output of the fourth magnetic sensor 11, the excitation switching timing for the second magnetic pole section 7a with respect to the rotation position of the rotor 3 corresponds to an electrical advance angle between angle 45 degrees to 90 degrees. That is, the fourth magnetic sensor 11 is arranged in a position where the amount of the advance angle from the position of the electrical advance angle 0 degree from the excitation switching timing at the second magnetic pole section 7a is larger than the amount of the lag angle from the position of the electrical advance angle 90 degrees from the excitation switching timing at the second magnetic pole section 7a.

(2) Counterclockwise Driving (2-i) Low Advance Angle Driving (Third Energization Mode)

The counterclockwise driving mode with low advance angle is described. Even for the counterclockwise rotation, the driving mode with low advance angle can achieve larger torque than that in the driving mode with high advance angle.

In the counterclockwise driving mode with low advance angle, the rotor 3 is rotated counterclockwise by switching excitation of each of the first magnetic pole sections 6a in response to an output signal of the third magnetic sensor 10 and switching excitation of each of the second magnetic pole sections 7a in response to an output signal of the fourth magnetic sensor 11. The direction of the counterclockwise rotation of the rotor 3 corresponds to a second rotation direction opposite to the first rotation direction.

In this driving mode, the energization direction of each of the first coil 4 and the second coil 5 is switched using combinations described below.

When the third magnetic sensor 10 detects the south pole of the magnet 2 (switching from the north pole to south pole), its detection signal is input into the control circuit 13. The control circuit 13 controls the driving circuit 14 such that the first magnetic pole section 6a is magnetized with the south pole. When the third magnetic sensor 10 detects the north pole of the magnet 2 (switching from the south pole to north pole), its detection signal is input into the control circuit 13. The control circuit 13 controls the driving circuit 14 such that the first magnetic pole section 6a is magnetized with the north pole.

When the fourth magnetic sensor 11 detects the south pole of the magnet 2 (switching from the north pole to south pole), its detection signal is input into the control circuit 13. The control circuit 13 controls the driving circuit 14 such that the second magnetic pole section 7a is magnetized with the north pole. When the fourth magnetic sensor 11 detects the north pole of the magnet 2 (switching from the south pole to north pole), its detection signal is input into the control circuit 13. The control circuit 13 controls the driving circuit 14 such that the second magnetic pole section 7a is magnetized with the south pole.

In the state illustrated in FIG. 15A, both the third magnetic sensor 10 and the fourth magnetic sensor 11 detect the south pole of the magnet 2. At this time, the control circuit 13 controls the driving circuit 14 such that the first magnetic pole section 6a is magnetized with the south pole and the second magnetic pole section 7a is magnetized with the north pole. This produces a counterclockwise rotation force in the rotor 3 and the magnet 2.

Figure 15F:
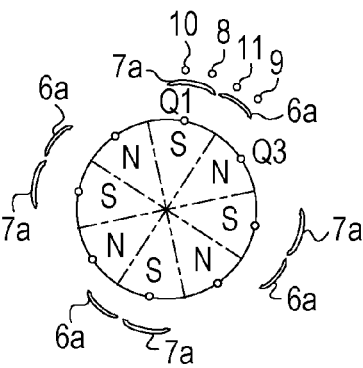

When the rotor 3 rotates counterclockwise from the state illustrated in FIG. 15A, the center Q1 of the south pole of the magnet 2 and the center of the second magnetic pole section 7a are opposed to each other, as illustrated in FIG. 15F.

Figure 15G:
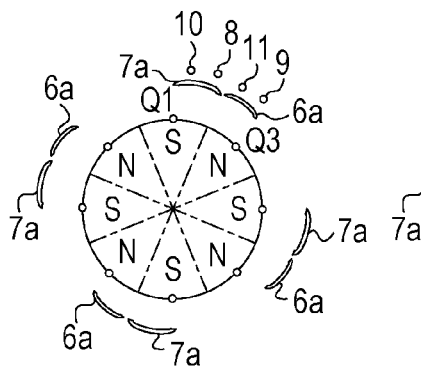

When the rotor 3 rotates counterclockwise from the state illustrated in FIG. 15F, the distance between the center Q1 of the south pole of the magnet 2 and the second magnetic pole section 7a is the same as the distance between the center Q3 of the north pole of the magnet 2 and the first magnetic pole section 6a, as illustrated in FIG. 15G.

The fourth magnetic sensor 11 is arranged such that when the magnetized polarity of the second magnetic pole section 7a is switched on the basis of the output of the fourth magnetic sensor 11, the excitation switching timing for the second magnetic pole section 7a with respect to the rotation position of the rotor 3 corresponds to an electrical advance angle between 0 degree to 45 degrees.

The north pole of the magnet 2 (switching from the south pole to north pole) is detected between the state illustrated in FIG. 15F and the state illustrated in FIG. 15G. At this time, the driving circuit 14 energizes the second coil 5 such that the second magnetic pole section 7a is magnetized with the south pole. Because the third magnetic sensor 10 detects the south pole of the magnet 2 between the state illustrated in FIG. 15F and the state illustrated in FIG. 15G, the driving circuit 14 energizes the first coil 4 such that the first magnetic pole section 6a is magnetized with the south pole. This produces the counterclockwise rotation force in the rotor 3 and the magnet 2.

Figure 15H:
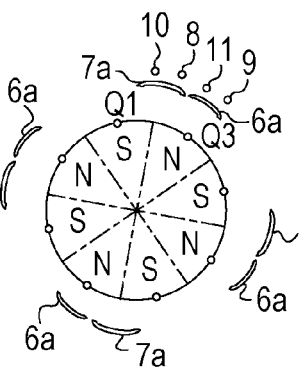

When the rotor 3 rotates counterclockwise from the state illustrated in FIG. 15G, the center Q3 of the north pole of the magnet 2 and the center of the first magnetic pole section 6a are opposed to each other, as illustrated in FIG. 15H.

Figure 15I:
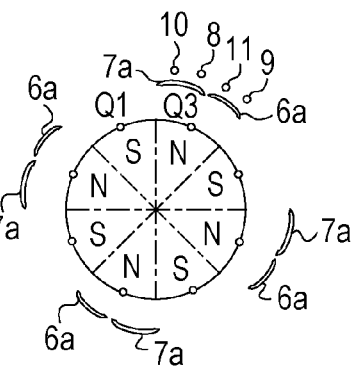

When the rotor 3 rotates counterclockwise from the state illustrated in FIG. 15H, the distance between the center Q3 of the north pole of the magnet 2 and the first magnetic pole section 6a is the same as the distance between the center Q3 of the north pole of the magnet 2 and the second magnetic pole section 7a, as illustrated in FIG. 15I.

The third magnetic sensor 10 is arranged such that when the magnetized polarity of the first magnetic pole section 6a is switched on the basis of the output of the third magnetic sensor 10, the excitation switching timing for the first magnetic pole section 6a with respect to the rotation position of the rotor 3 corresponds to an electrical advance angle between angle 0 degree to 45 degrees.

The third magnetic sensor 10 detects the north pole of the magnet 2 (switching from the south pole to north pole) between the state illustrated in FIG. 15H and the state illustrated in FIG. 15I. At this time, the driving circuit 14 energizes the first coil 4 such that the first magnetic pole section 6a is magnetized with the north pole. Because the fourth magnetic sensor 11 detects the north pole of the magnet 2 between the state illustrated in FIG. 15H and the state illustrated in FIG. 15I, the driving circuit 14 energizes the second coil 5 such that the second magnetic pole section 7a is magnetized with the south pole. This produces the counterclockwise rotation force in the rotor 3 and the magnet 2.

As described above, in the counterclockwise driving mode with low advance angle, the energization of the first coil 4 and the second coil 5 is sequentially switched by the outputs of the third magnetic sensor 10 and the fourth magnetic sensor 11, and the rotor 3 and the magnet 2 rotate in a counterclockwise direction.

When the rotor 3 rotates counterclockwise and the magnetized polarity of the first magnetic pole section 6a is switched on the basis of the output of the third magnetic sensor 10, the excitation switching timing for the first magnetic pole section 6a with respect to the rotation position of the rotor 3 corresponds to an electrical advance angle between angle 0 degree to 45 degrees.

When the rotor 3 rotates counterclockwise and the magnetized polarity of the second magnetic pole section 7a is switched on the basis of the output of the fourth magnetic sensor 11, the excitation switching timing for the second magnetic pole section 7a with respect to the rotation position of the rotor 3 corresponds to an electrical advance angle between angle 0 degree to 45 degrees.

(2-ii) High Advance Angle Driving (Fourth Energization Mode)

The counterclockwise driving mode with high advance angle is described. Even for the counterclockwise rotation, the driving mode with high advance angle can achieve higher speed rotation than that in the above-described driving mode with low advance angle.

In the counterclockwise driving mode with high advance angle, the rotor 3 is rotated counterclockwise by switching excitation of each of the first magnetic pole sections 6a in response to an output signal of the first magnetic sensor 8 and switching excitation of each of the second magnetic pole sections 7a in response to an output signal of the second magnetic sensor 9.

In this driving mode, the energization direction of each of the first coil 4 and the second coil 5 is switched using combinations described below.

When the first magnetic sensor 8 detects the south pole of the magnet 2 (switching from the north pole to south pole), its detection signal is input into the control circuit 13. The control circuit 13 controls the driving circuit 14 such that the first magnetic pole section 6a is magnetized with the south pole. When the first magnetic sensor 8 detects the north pole of the magnet 2 (switching from the south pole to north pole), its detection signal is input into the control circuit 13. The control circuit 13 controls the driving circuit 14 such that the first magnetic pole section 6a is magnetized with the north pole.

When the second magnetic sensor 9 detects the south pole of the magnet 2 (switching from the north pole to south pole), its detection signal is input into the control circuit 13. The control circuit 13 controls the driving circuit 14 such that the second magnetic pole section 7a is magnetized with the north pole. When the second magnetic sensor 9 detects the north pole of the magnet 2 (switching from the south pole to north pole), its detection signal is input into the control circuit 13. The control circuit 13 controls the driving circuit 14 such that the second magnetic pole section 7a is magnetized with the south pole.

In the state illustrated in FIG. 15A, both the first magnetic sensor 8 and the second magnetic sensor 9 detect the south pole of the magnet 2. Accordingly, when the first magnetic pole section 6a is magnetized with the south pole and the second magnetic pole section 7a is magnetized with the north pole, the counterclockwise rotation force is produced in the rotor 3 and the magnet 2.

When the rotor 3 rotates counterclockwise from the state illustrated in FIG. 15A, the center Q1 of the south pole of the magnet 2 and the center of the second magnetic pole section 7a are opposed to each other, as illustrated in FIG. 15F.

The second magnetic sensor 9 is arranged such that when the magnetized polarity of the second magnetic pole section 7a is switched on the basis of the output of the second magnetic sensor 9, the excitation switching timing for the second magnetic pole section 7a with respect to the rotation position of the rotor 3 corresponds to an electrical advance angle between 45 degrees to 90 degrees.

The second magnetic sensor 9 detects the north pole of the magnet 2 (switching from the south pole to north pole) between the state illustrated in FIG. 15A and the state illustrated in FIG. 15F. At this time, the driving circuit 14 energizes the second coil 5 such that the second magnetic pole section 7a is magnetized with the north pole. Because the first magnetic sensor 8 detects the south pole of the magnet 2 between the state illustrated in FIG. 15A and the state illustrated in FIG. 15F, the driving circuit 14 energizes the first coil 4 such that the first magnetic pole section 6a is magnetized with the south pole. This produces the counterclockwise rotation force in the rotor 3 and the magnet 2.

When the rotor 3 rotates counterclockwise from the state illustrated in FIG. 15F, the state moves to the state illustrated in FIG. 15G, and then the center Q3 of the north pole of the magnet 2 and the center of the first magnetic pole section 6a are opposed to each other, as illustrated in FIG. 15H.

The first magnetic sensor 8 is arranged such that when the magnetized polarity of the first magnetic pole section 6a is switched on the basis of the output of the first magnetic sensor 8, the excitation switching timing for the first magnetic pole section 6a with respect to the rotation position of the rotor 3 corresponds to an electrical advance angle between 45 degrees to 90 degrees.

The first magnetic sensor 8 detects the north pole of the magnet 2 (switching from the south pole to north pole) between the state illustrated in FIG. 15G and the state illustrated in FIG. 15H. At this time, the driving circuit 14 energizes the first coil 4 such that the first magnetic pole section 6a is magnetized with the north pole. Because the second magnetic sensor 9 detects the north pole of the magnet 2 between the state illustrated in FIG. 15G and the state illustrated in FIG. 15H, the driving circuit 14 energizes the second coil 5 such that the second magnetic pole section 7a is magnetized with the south pole. This produces the counterclockwise rotation force in the rotor 3 and the magnet 2.

As described above, in the counterclockwise driving mode with high advance angle, the energization of the first coil 4 and the second coil 5 is sequentially switched by the outputs of the first magnetic sensor 8 and the second magnetic sensor 9, and the rotor 3 and the magnet 2 rotate in a counterclockwise direction.

When the rotor 3 rotates counterclockwise and the magnetized polarity of the first magnetic pole section 6a is switched on the basis of the output of the first magnetic sensor 8, the excitation switching timing for the first magnetic pole section 6a with respect to the rotation position of the rotor 3 corresponds to an electrical advance angle between angle 45 degrees to 90 degrees.

When the rotor 3 rotates counterclockwise and the magnetized polarity of the second magnetic pole section 7a is switched on the basis of the output of the second magnetic sensor 9, the excitation switching timing for the second magnetic pole section 7a with respect to the rotation position of the rotor 3 corresponds to an electrical advance angle between angle 45 degrees to 90 degrees.

FIGS. 16A to 16D are illustrations for describing positions in which the first magnetic sensor 8, the second magnetic sensor 9, the third magnetic sensor 10, and the fourth magnetic sensor 11 are arranged. As illustrated in FIGS. 16A to 16D, the first magnetic sensor 8 in the motor 1 according to the present embodiment is arranged in a position that satisfies the following conditions.

Figure 16A:
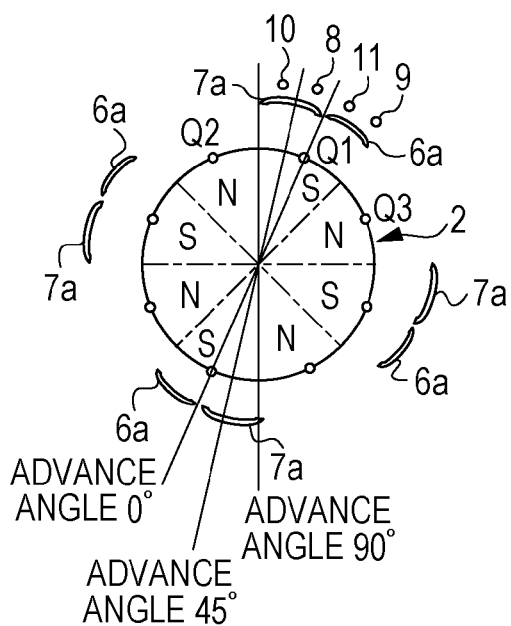
FIGS. 16A to 16D are illustrations for describing positions in which a first magnetic sensor 8, a second magnetic sensor 9, a third magnetic sensor 10, and a fourth magnetic sensor 11 are arranged.

(a) In the clockwise driving, when the magnetized polarity of the first magnetic pole section 6a is switched on the basis of the output of the first magnetic sensor 8, the excitation switching timing for the first magnetic pole section 6a with respect to the rotation position of the rotor 3 corresponds to an electrical advance angle between 0 degree and 45 degrees (see FIG. 16A).

Figure 16B:
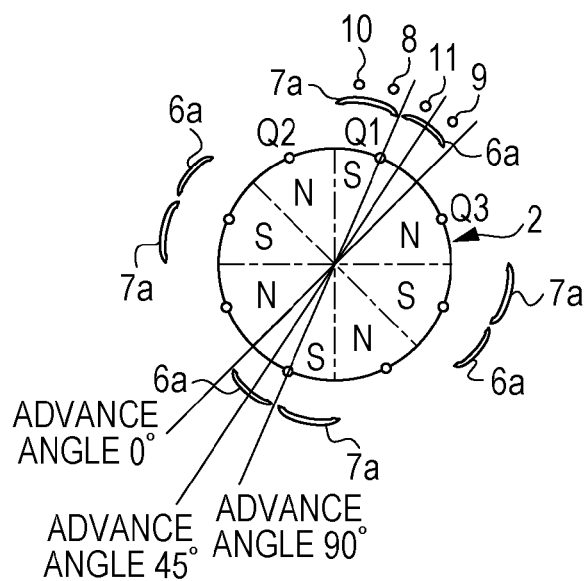
Figure 16C:
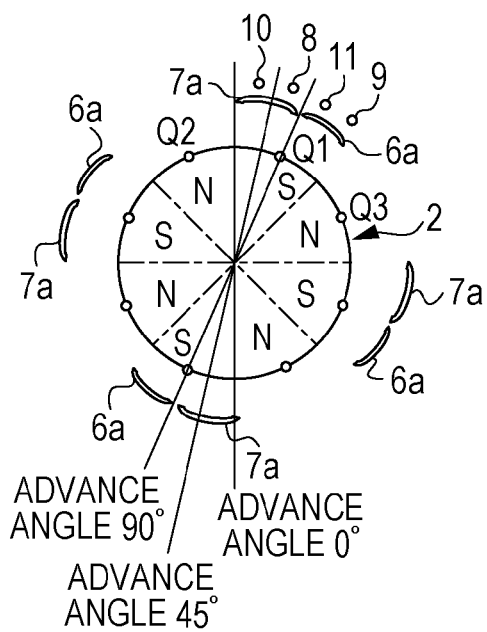

(b) In the counterclockwise driving, when the magnetized polarity of the first magnetic pole section 6a is switched on the basis of the output of the first magnetic sensor 8, the excitation switching timing for the first magnetic pole section 6a with respect to the rotation position of the rotor 3 corresponds to an electrical advance angle between 45 degrees and 90 degrees (see FIG. 16C).

The second magnetic sensor 9 in the motor 1 according to the present embodiment is arranged in a position that satisfies the following conditions.

(c) In the clockwise driving, when the magnetized polarity of the second magnetic pole section 7a is switched on the basis of the output of the second magnetic sensor 9, the excitation switching timing for the second magnetic pole section 7a with respect to the rotation position of the rotor 3 corresponds to an electrical advance angle between 0 degree and 45 degrees (see FIG. 16B).

Figure 16D:
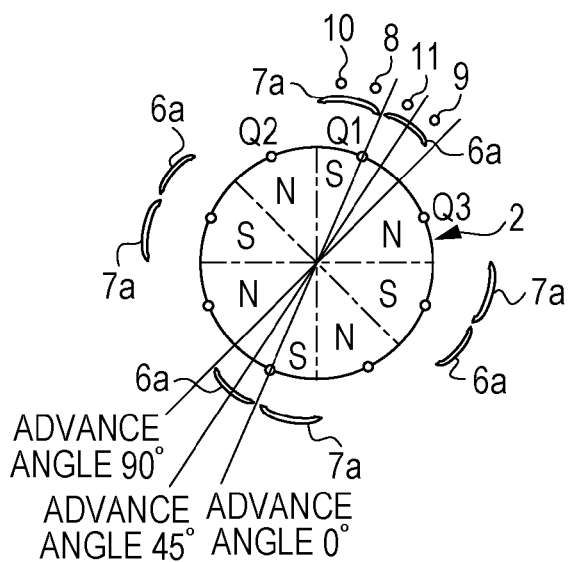

(d) In the counterclockwise driving, when the magnetized polarity of the second magnetic pole section 7a is switched on the basis of the output of the second magnetic sensor 9, the excitation switching timing for the second magnetic pole section 7a with respect to the rotation position of the rotor 3 corresponds to an electrical advance angle between 45 degrees and 90 degrees (see FIG. 16D).

The third magnetic sensor 10 in the motor 1 according to the present embodiment is arranged in a position that satisfies the following conditions.

(e) In the clockwise driving, when the magnetized polarity of the first magnetic pole section 6a is switched on the basis of the output of the third magnetic sensor 10, the excitation switching timing for the first magnetic pole section 6a with respect to the rotation position of the rotor 3 corresponds to an electrical advance angle between 45 degrees and 90 degrees (see FIG. 16A).

(f) In the counterclockwise driving, when the magnetized polarity of the first magnetic pole section 6a is switched on the basis of the output of the third magnetic sensor 10, the excitation switching timing for the first magnetic pole section 6a with respect to the rotation position of the rotor 3 corresponds to an electrical advance angle between 0 degree and 45 degrees (see FIG. 16C).

The fourth magnetic sensor 11 in the motor 1 according to the present embodiment is arranged in a position that satisfies the following conditions.

(g) In the clockwise driving, when the magnetized polarity of the second magnetic pole section 7a is switched on the basis of the output of the fourth magnetic sensor 11, the excitation switching timing for the second magnetic pole section 7a with respect to the rotation position of the rotor 3 corresponds to an electrical advance angle between 45 degrees and 90 degrees (see FIG. 16B).

(h) In the counterclockwise driving, when the magnetized polarity of the second magnetic pole section 7a is switched on the basis of the output of the fourth magnetic sensor 11, the excitation switching timing for the second magnetic pole section 7a with respect to the rotation position of the rotor 3 corresponds to an electrical advance angle between 0 degree and 45 degrees (see FIG. 16D).

In the present embodiment, in consideration of errors in magnetization of magnets, errors in dimensions of sensors, errors of yokes, each magnetic sensor is arranged in a range described below.

The first magnetic sensor 8 is arranged in a range where the excitation switching timing for the first magnetic pole section 6a in the clockwise driving corresponds to an electrical advance angle between 14.4 degrees and 33.6 degrees and the excitation switching timing for the first magnetic pole section 6a in the counterclockwise driving corresponds to an electrical advance angle between 56.4 degrees and 75.6 degrees.

The second magnetic sensor 9 is arranged in a range where the excitation switching timing for the second magnetic pole section 7a in the clockwise driving corresponds to an electrical advance angle between 14.4 degrees and 33.6 degrees and the excitation switching timing for the second magnetic pole section 7a in the counterclockwise driving corresponds to an electrical advance angle between 56.4 degrees and 75.6 degrees.

The third magnetic sensor 10 is arranged in a range where the excitation switching timing for the first magnetic pole section 6a in the clockwise driving corresponds to an electrical advance angle between 56.4 degrees and 75.6 degrees and the excitation switching timing for the first magnetic pole section 6a in the counterclockwise driving corresponds to an electrical advance angle between 14.4 degrees and 33.6 degrees.

The fourth magnetic sensor 11 is arranged in a range where the excitation switching timing for the second magnetic pole section 7a in the clockwise driving corresponds to an electrical advance angle between 56.4 degrees and 75.6 degrees and the excitation switching timing for the second magnetic pole section 7a in the counterclockwise driving corresponds to an electrical advance angle between 14.4 degrees and 33.6 degrees.

The midpoint of a line segment connecting the first magnetic sensor 8 and the third magnetic sensor 10 corresponds to the electrical advance angle 45 degrees at the excitation switching timing for the first magnetic pole section 6a. The midpoint of a line segment connecting the second magnetic sensor 9 and the fourth magnetic sensor 11 corresponds to the electrical advance angle 45 degrees at the excitation switching timing for the second magnetic pole section 7a. This reduces variations in driving characteristics between the clockwise driving and the counterclockwise driving in the present embodiment.

The present embodiment uses a sensor unit in which the first magnetic sensor 8 and the third magnetic sensor 10 constitute a single unit and the second magnetic sensor 9 and the fourth magnetic sensor 11 constitute a single unit. In this case, in the clockwise driving, the first magnetic sensor 8 is in the position where the excitation switching timing for the first magnetic pole section 6a corresponds to the electrical advance angle 21 degrees, and the third magnetic sensor 10 is in the position where the excitation switching timing for the first magnetic pole section 6a corresponds to the electrical advance angle 69 degrees. In the clockwise driving, the second magnetic sensor 9 is in the position where the excitation switching timing for the second magnetic pole section 7a corresponds to the electrical advance angle 21 degrees, and the fourth magnetic sensor 11 is in the position where the excitation switching timing for the second magnetic pole section 7a corresponds to the electrical advance angle 69 degrees.

The present invention can provide a shutter device in which, when a driven member is driven by a stepping motor and thus a light shielding member moves from a closed state to an open state or from the open state to the closed state, a stepping motor does not lose synchronization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2013/080757, filed Nov. 14, 2013, which is hereby incorporated by reference herein in its entirety.

The invention claimed is:

1. A shutter device comprising:
a stepping motor configured to be driven in open-loop driving mode at which an energization state of a coil is switched at predetermined time intervals and in feed-back driving mode at which the energization state of the coil is switched in accordance with a rotation position of a rotor;
a driven member configured to be driven by the stepping motor; and
a light shielding member configured to travel between a closed state in which an aperture is closed and an open state in which the aperture is open,
wherein the light shielding member is driven by the driven member,
wherein the driven member is configured to provide a first driven zone and a second driven zone,
wherein in a case where the driven member is driven in the first driven zone, the light shielding member maintains the closed state or the open state,
wherein in a case where the driven member is driven in the second driven zone, the light shielding member travels from the closed state to the open state or from the open state to the closed state,
wherein the driven member is driven in the first driven zone by the stepping motor in one direction, and after the driven member is driven in the first driven zone, the driven member is driven in the second driven zone,
wherein in a case where the driven member is driven in the first driven zone, the stepping motor drives the driven member in the open-loop driving mode, and
wherein in a case where the driven member is driven in the second driven zone, the stepping motor drives the driven member in the feed-back driving mode.

2. The shutter device according to claim 1, wherein the driven member has a cam groove,
wherein the light shielding member has a follower portion which follows the cam groove,
wherein the cam groove has a first cam region and a second cam region,
wherein in a case where the follower portion follows the first cam region, the light shielding member maintains the closed state or the open state, and
wherein in a case where the follower portion follows the second cam region, the light shielding member travels from the closed state to the open state or from the open state to the closed state.

3. The shutter device according to claim 2, wherein the driven member is a rotating member, and
wherein the rotating member includes a circumferential portion to which a weight is fixed.

4. The shutter device according to claim 1, further comprising: an urging member configured to urge the driven member,
wherein before the driven member is driven in the first driven zone, the stepping motor charges the urging member by driving the driven member in the feed-back driving mode, and
wherein in a case where the driven member is driven in the first driven zone, the urging member urges the driven member.

5. The shutter device according to claim 4, wherein the stepping motor is configured to be driven in first feed-back driving at which an advance angle value is low and in second feed-back driving at which the advance angle value is high,
wherein before the driven member is driven in the first driven zone, the stepping motor charges the urging member by driving the driven member in the first feed-back driving mode, and
wherein in a case where the driven member is driven in the second driven zone, the stepping motor drives the driven member in the second feed-back driving mode.

6. The shutter device according to claim 5, wherein the driven member has a third zone,
wherein the driven member is driven in the second driven zone by the stepping motor in one direction, and after the driven member is driven in the second driven zone, the driven member is driven in the third driven zone,
wherein in a case where the driven member is driven in the third driven zone, the light shielding member maintains the closed state or the open state, and
wherein in a case where the driven member is driven in the third driven zone, the stepping motor charges the urging member by driving the driven member in the second feed-back driving mode.

7. The shutter device according to claim 6, wherein after the driven member is driven in the third driven zone and the urging member is charged, the stepping motor holds a current supply.

8. An image pickup apparatus comprising a shutter device, the shutter device comprising:
a stepping motor configured to be driven in open-loop driving mode at which an energization state of a coil is switched at predetermined time intervals and in feed-back driving mode at which the energization state of the coil is switched accordance with a rotation position of a rotor;
a driven member configured to be driven by the stepping motor; and
a light shielding member configured to travel between a closed state in which an aperture is closed and an open state in which the aperture is open,
wherein the light shielding member is driven by the driven member,
wherein the driven member is configured to provide a first driven zone and a second driven zone,
wherein in a case where the driven member is driven in the first driven zone, the light shielding member maintains the closed state or the open state,
wherein in a case where the driven member is driven in the second driven zone, the light shielding member travels from the closed state to the open state or from the open state to the closed state,
wherein the driven member is driven in the first driven zone by the stepping motor in one direction, and after the driven member is driven in the first driven zone, the driven member is driven in the second driven zone, wherein in a case wherein the driven member is driven in the first driven zone, the stepping motor drives the driven member in the open-loop driving mode, and wherein in a case where the driven member is driven in the second driven zone, the stepping motor drives the driven member in the feed-back driving mode.

9. The image pickup apparatus according to claim 8, wherein the driven member has a cam groove, wherein the light shielding member has a follower portion which follows the cam groove, wherein the cam groove has a first cam region and a second cam region, wherein in a case where the follower portion follows the first cam region, the light shielding member maintains the closed state or the open state, wherein in a case where the follower portion follows the second cam region, the light shielding member travels from the closed state to the state or from the open state to the closed state.

10. The image pickup apparatus according to claim 9, wherein the driven member is a rotating member, and wherein the rotating member includes a circumferential portion to which a weight is fixed.

11. The image pickup apparatus according to claim 8, wherein the shutter device comprises:

an urging member configured to urge the driven member, wherein before the driven member is driven in the first driven zone, the stepping motor charges the urging member by driving the driven member in the feed-back driving mode, and wherein in a case where the driven member is driven in the first driven zone, the urging member urges the driven member.

12. The image pickup apparatus according to claim 11, wherein the stepping motor is configured to be driven in first feed-back driving at which an advance angle value is low and in second feed-back driving at which the advance angle value is high, wherein before the driven member is driven in the first driven zone, the stepping motor charges the urging member by driving the driven member in the first feed-back driving mode, and wherein in a case where the driven member is driven in the second driven zone, the stepping motor drives the driven member in the second feed-back driving mode.

13. The image pickup apparatus according to claim 12, wherein the driven member has a third zone, wherein the driven member is driven in the second driven zone by the stepping motor in one direction, and after the driven member is driven in the second driven zone, the driven member is driven in the third zone, wherein in a case where the driven member is driven in the third driven zone, the light shielding member maintains the closed state or the open state, and wherein in a case where the driven member is driven in the third driven zone, the stepping motor charges the urging member by driving the driven member in the second feed-back driving mode.

14. The image pickup apparatus according to claim 13, wherein after the driven member is driven in the third driven zone and the urging member is charged, the stepping motor holds a current supply.

\* \* \* \* \*